(12) United States Patent
Palm

(10) Patent No.: US 6,917,647 B2
(45) Date of Patent: Jul. 12, 2005

(54) ACTIVATION OF MULTIPLE XDSL MODEMS WITH POWER CONTROL MEASUREMENT

(75) Inventor: Stephen Palm, Sunnyvale, CA (US)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 10/809,865

(22) Filed: Mar. 26, 2004

(65) Prior Publication Data

US 2004/0184520 A1 Sep. 23, 2004

Related U.S. Application Data

(63) Continuation of application No. 09/564,704, filed on May 4, 2000, now Pat. No. 6,751,254.
(60) Provisional application No. 60/168,628, filed on Dec. 3, 1999, provisional application No. 60/162,150, filed on Oct. 29, 1999, provisional application No. 60/159,588, filed on Oct. 18, 1999, provisional application No. 60/146,140, filed on Jul. 30, 1999, provisional application No. 60/136,333, filed on May 26, 1999, and provisional application No. 60/132,702, filed on May 5, 1999.

(51) Int. Cl.$^7$ ................................................. H04B 1/38
(52) U.S. Cl. ....................................................... 375/222
(58) Field of Search ................................. 375/222, 223, 375/320, 268, 261, 322; 455/522, 434, 13.3, 69; 370/431, 329

(56) References Cited

U.S. PATENT DOCUMENTS

| | | | |
|---|---|---|---|
| 4,679,227 A | 7/1987 | Hughes-Hartogs | |
| 4,680,773 A | 7/1987 | Amundson | |
| 4,897,831 A | 1/1990 | Negi et al. | |

(Continued)

FOREIGN PATENT DOCUMENTS

| | | |
|---|---|---|
| CA | 2027230 | 4/1991 |
| CA | 2111543 | 6/1994 |
| EP | 0513527 | 11/1992 |

(Continued)

OTHER PUBLICATIONS

ITU–T Recommendation V.8 bis ("Procedure for the Identification and Selection of Common Modes of Operation Between Data Circuit–Terminating Equipments (DCEs) and Between Data Terminal Equipments (DTEs) Over the General Switched Telephone Network and On Leased Point-to–Point Telephone–Type Circuits"), published by the International Telecommunication Union in Aug. 1996.

(Continued)

*Primary Examiner*—Khai Tran
(74) *Attorney, Agent, or Firm*—Greenblum & Bernstein, P.L.C.

(57) ABSTRACT

An apparatus and method for determining transmission parameters while initializing a communication link. An initiating communication device includes a parameter indicating device, a measurement receiving section, a parameter receiving device, a measurement transmission section, and a selecting device. The parameter indicating device transmits first transmission parameters that can be used by a responding communication device. In response to the transmitted first transmission parameters, the measurement receiving section receives first signals issued by the responding communication device. The parameter receiving device receives second transmission parameters that are issued by the responding communication device. The measurement transmission section functions to transmit second signals to the responding communication device, in response to the received second transmission parameters. The selecting device transmits power level parameters that can be used by said responding communication device in response to said received second signals.

23 Claims, 17 Drawing Sheets

U.S. PATENT DOCUMENTS

| | | |
|---|---|---|
| 4,953,210 A | 8/1990 | McGlynn et al. |
| 5,144,651 A | 9/1992 | Cooper |
| 5,163,131 A | 11/1992 | Row et al. |
| 5,280,586 A | 1/1994 | Kunz et al. |
| 5,311,578 A | 5/1994 | Bremer et al. |
| 5,321,722 A | 6/1994 | Ogawa |
| 5,345,596 A * | 9/1994 | Buchenhorner et al. .... 455/450 |
| 5,349,635 A | 9/1994 | Scott |
| 5,371,534 A | 12/1994 | Dagdeviren et al. |
| 5,377,188 A | 12/1994 | Seki |
| 5,400,322 A | 3/1995 | Hunr et al. |
| 5,410,343 A | 4/1995 | Coddington et al. |
| 5,448,566 A | 9/1995 | Richter et al. |
| 5,463,382 A | 10/1995 | Nikas et al. |
| 5,463,661 A | 10/1995 | Moran, III et al. |
| 5,479,447 A | 12/1995 | Chow et al. |
| 5,491,720 A | 2/1996 | Davis et al. |
| 5,493,609 A | 2/1996 | Davis et al. |
| 5,581,557 A * | 12/1996 | Stessens et al. ............ 370/431 |
| 5,606,325 A * | 2/1997 | Masudaya .............. 342/357.08 |
| 5,608,764 A | 3/1997 | Sugita et al. |
| 5,633,890 A | 5/1997 | Ahmed |
| 5,644,573 A | 7/1997 | Jacobsen et al. |
| 5,668,857 A | 9/1997 | MccHale |
| 5,682,419 A | 10/1997 | Grube et al. |
| 5,715,277 A | 2/1998 | Goodson et al. |
| 5,751,914 A | 5/1998 | Coley et al. |
| 5,757,803 A | 5/1998 | Russell et al. |
| 5,781,617 A | 7/1998 | MccHale |
| 5,796,808 A | 8/1998 | Scott et al. |
| 5,805,669 A | 9/1998 | Bingel et al. |
| 5,826,198 A | 10/1998 | Bergins et al. |
| 5,852,655 A | 12/1998 | MccHale |
| 5,903,608 A | 5/1999 | Chun |
| 5,910,970 A | 6/1999 | Lu |
| 5,912,921 A | 6/1999 | Warren et al. |
| 5,933,454 A | 8/1999 | Cioffi |
| 5,970,088 A | 10/1999 | Chen |
| 6,009,122 A | 12/1999 | Chow et al. |
| 6,028,851 A * | 2/2000 | Persson et al. ............ 370/329 |
| 6,044,107 A | 3/2000 | Gatherer et al. |
| 6,055,268 A | 4/2000 | Timm et al. |
| 6,064,693 A | 5/2000 | Oliver et al. |
| 6,081,517 A | 6/2000 | Liu et al. |
| 6,141,354 A | 10/2000 | Nakatsugawa |
| 6,163,696 A * | 12/2000 | Bi et al. ..................... 455/436 |
| 6,205,208 B1 | 3/2001 | Detlefsen et al. |
| 6,263,016 B1 | 7/2001 | Bellenger et al. |
| 6,298,065 B1 | 10/2001 | Dombkowski et al. |
| 6,307,836 B1 | 10/2001 | Jones et al. |
| 6,438,226 B1 | 8/2002 | Guenther et al. |
| 6,466,586 B1 | 10/2002 | Darveau et al. |
| 6,694,470 B1 | 2/2004 | Plam |
| 6,735,245 B1 | 5/2004 | Plam |
| 6,751,254 B1 * | 6/2004 | Palm .......................... 375/222 |
| 2003/0103559 A1 | 6/2003 | Plam |
| 2003/0165188 A1 | 9/2003 | Plam |
| 2003/0193929 A1 | 10/2003 | Palm |
| 2003/0206580 A1 | 11/2003 | Plam |
| 2004/0027998 A1 | 2/2004 | Plam |
| 2004/0052308 A1 | 3/2004 | Plam |
| 2004/0057510 A1 | 3/2004 | Plam |
| 2004/0068686 A1 | 4/2004 | Plam |

FOREIGN PATENT DOCUMENTS

| | | |
|---|---|---|
| EP | 0601260 | 6/1994 |
| EP | 0820168 | 1/1998 |
| EP | 0831624 | 3/1998 |
| EP | 0974202 | 7/1999 |
| JP | 6-97980 | 4/1994 |
| JP | 10-75279 | 3/1998 |
| WO | 97/49229 | 12/1997 |
| WO | 98/10545 | 3/1998 |
| WO | 99/35756 | 7/1999 |

OTHER PUBLICATIONS

An article by F. Mescam, entitled "Introduction A La Procedure De Transmission HDLC", published at pp. 69–73 of L=Onde Electrique, vol. 53, no. 2 (Feb., 1973).

An articled by H. Ohba et al., entitled "End–to–End Protocol Based On CCITT X.25 and Its 26–29, Implementation", published at pp. 281–287 of Evolutions In Computer Communications, Kyoto Sep. 1978, International Conference On Computer Communication, Tokyo, Japan, vol. CONF. 4, Sep. 1978.

An articled by K. Krechmer at pp. 63, 64 and 66 of Data Communications, McGraw Hill, NY, vol. 23, no. 2 (Jan. 21, 1994), entitled "V.34 Modems: Off to a Fast Start?".

An article published in the periodical, "Nikkei Communications," vol. 252, Aug. 18, 1997, pp. 80–89.

ITU–T recommendation G.994.1 ("Handshake Procedure For Digital Subscriber Line (DSL) Transceivers"), published by the International Telecommunication Union in Feb., 2001.

English Language Abstract of JP 6–97980.

ITU–T Recommendation V.8 bis ("Procedures for the Identification and Selection of Common Modes of Operation Between Data Circuit–Terminating Equipment (DCEs) and Between Data Terminal Equipments (DTEs) Over the General Switched Telephone Network and On Leased Point-to–Point Telephone–Type Circuits"), which was published by the International Telecommunication Union in Aug., 1996.

An article by K. Krechmer at pp. 63, 64 and 66 of Data Communications, McGraw Hill, NY, vol. 23, No. 2 (Jan. 21, 1994).

* cited by examiner

ACTIVATION OF MULTIPLE XDSL MODEMS WITH POWER CONTROL MEASUREMENT

CROSS-REFERENCE TO RELATED APPLICATIONS

This application is a continuation of U.S. patent application Ser. No. 09/564,704 filed on May 4, 2000 now U.S. Pat. No 6,751,254, which claims the benefit under 35 U.S.C. §119(e) of U.S. Provisional Application No. 60/132,702, filed on May 5, 1999; U.S. Provisional Application No. 60/136,333, filed on May 26, 1999; U.S. Provisional Application No. 60/146,140, filed on Jul. 30, 1999; U.S. Provisional Application No. 60/159,588, filed on Oct. 18, 1999; U.S. Provisional Application No. 60/162,150, filed on Oct. 29,1999; and U.S. Provisonal Application No. 60/168,628, filed on Dec. 3, 1999, the disclosures of which are expressly incorporated by reference herein in their entirety.

BACKGROUND OF THE INVENTION

Definitions

The following definitions are employed throughout the detail discussion:

activating station—the DTE, DCE and other associated terminal equipment which originates an activation of an xDSL service;

answering station—the DTE, DCE and other associated terminal equipment which answers a call placed on the PSTN (GSTN);

carrier set—a set of one or more frequencies associated with a PSD mask of a particular xDSL Recommendation;

CAT3—cabling and cabling components designed and tested to transmit cleanly to 16 MHz of communications. Used for voice and data/LAN traffic to 10 megabits per second;

CAT5—cabling and cabling components designed and tested to transmit cleanly to 100 MHz of communications;

communication method—form of communication sometimes referred to as modems, modulations, line codes, etc.;

downstream—direction of transmission from the xTU-C to the xTU-R,

Galf—an octet having the value $81_{16}$; i.e., the ones complement of an HDLC flag;

initiating signal—signal which initiates a startup procedure;

initiating station—DTE, DCE and other associated terminal equipment which initiates a startup procedure;

invalid frame—frame that has fewer than four octets between flags, excluding transparency octets;

message—framed information conveyed via modulated transmission;

metallic local loop—communication channel 5, the metallic wires that form the local loop to the customer premise;

responding signal—signal sent in response to an initiating signal;

responding station—station that responds to initiation of a communication transaction from the remote station;

session—active communications connection, measured from beginning to end, between computers or applications over a network;

signal—information conveyed via tone based transmission;

signaling family—group of carrier sets which are integral multiples of a given carrier spacing frequency;

splitter—combination of a high pass filter and a low pass filter designed to split a metallic local loop into two bands of operation;

telephony mode—operational mode in which voice or other audio (rather than modulated information-bearing messages) is selected as the method of communication;

transaction—sequence of messages, ending with either a positive acknowledgment [ACK(1)], a negative acknowledgment (NAK), or a time-out;

terminal—station; and upstream: The direction of transmission from the xTU-R to the xTUC.

Abbreviations

The following abbreviations are used throughout the detailed discussion:

ACK—Acknowledge Message;
ADSL—Asymmetric Digital Subscriber Line;
CCITT—International Telegraph and Telephone Consultative Committee;
CDSL—Consumer Digital Subscriber Line;
DSL—Digital Subscriber Line;
FSK—Frequency Shift Keying;
GSTN—General Switched Telephone Network (same as PSTN);
HDSL—High bit rate Digital Subscriber Line;
HSTU-C—handshaking portion of the xDSL central terminal unit (xTU);
HSTU-R—handshaking portion of the xDSL remote terminal unit (xTU-R).
ISO—International Organization for Standardization;
ITU-T—International Telecommunication Union—Telecommunication Standardization Sector;
NAK—Negative Acknowledge Message;
NTU—Network Termination Unit (Customer premise end);
PBO—Power Back Off,
PME—Power Management Exchange
PMM—Power Measurement Modulation;
PMMS—Power Measurement Modulation Session;
POTS—Plain Old Telephone Service
PSD—Power Spectral Density;
PSTN—Public Switched Telephone Network;
RADSL—Rate Adaptive DSL;
VDSL—Very high speed Digital Subscriber Line;
xDSL—any of the various types of Digital Subscriber Lines (DSL);
xTU-C—central terminal unit of an xDSL; and
xTU-R—remote terminal unit of an xDSL.

1. Field of the Invention

The present invention is directed to a high speed communications device, such as, for example, but not limited to, a modem, a cable modem, a xDSL modem, a satellite communication system, a point-to-point wired or wireless communication system, which includes a handshaking or initialing protocol, and in particular, to an apparatus and method that provides means to robustly select measurement procedures and robustly report the results of such measurement procedures.

2. Discussion of Background and Other Information

One of the important functionalities of the various xDSL schemes is to accurately control the amount of transmit power used on a specific xDSL line. Since each local loop used for xDSL has unique parameters, such as, for example, attenuation, interference, crosstalk, etc, it is desirable to accurately measure those parameters before blindly transmitting large amounts of power into the loop. Heretofore, each xDSL scheme has used it's own proprietary style of power measurement and control, with varying degrees of measurement and control.

Additionally, the power control measurement procedures of the prior art were typically used after the xDSL modulation had started, with large amounts of power already being transmitted.

Accordingly, there is a need for an apparatus and method that provides means to robustly select measurement procedures and robustly report the results of such measurement procedures, so as to minimize the amount of transmission power used to transmit data.

The ITU-T has published recommended methods for initiating data communication over voice band channels. The following three Recommendations have been produced, the subject matter of which is expressly incorporated herein by reference in their entirety:

1) Recommendation V.8, entitled "Procedures For Starting Sessions Of Data Transmission Over The General Switched Telephone Network", published in September, 1994;

2) Recommendation V.8bis, entitled "Procedures For The Identification And Selection Of Common Modes Of Operation Between Data Circuit-Terminating Equipments (DCEs) And Between Data Terminal Equipments (DTEs) Over The General Switched Telephone Network", published in August, 1996; and 3) Recommendation G.994.1, entitled "Handshake Procedures For Digital Subscriber Line (DSL) Transceivers", published in June 1999.

It is noted that document (3) is the final version of Temporary Document MA-006 that was published in March, 1999.

SUMMARY OF THE INVENTION

Accordingly, an object of the present invention is to provide a uniform power measurement procedure that can be used for all xDSL schemes. Another object of the instant invention is to perform the uniform power measurement procedure prior to the selection of the specific xDSL scheme. The procedure of the instant invention may be implemented as an extension to an xDSL handshaking and selection procedure, such as, but not limited to, that shown in commonly assigned U.S. patent application Ser. No. 09/217,556 filed on Dec. 21, 1998 and/or U.S. patent application Ser. No. 09/281,813 filed on Mar. 31, 1999, and/or ITU-T Recommendation G.994. 1, published in June, 1999. Integrating the power control and measurement procedure with the xDSL selection procedure allows a more accurate selection of the particular xDSL modulation scheme, based on the power measurement results. The present invention also allows for a more accurate determination of the minimum needed frequency dependent transmission power during a data transmission mode.

According to an object of the present invention, an apparatus is disclosed for determining transmission parameters while initializing a communication link. A parameter indicating device, that is associated with an initiating communication device, transmits first transmission parameters that can be used by the responding communication device to a responding communication device. In response to the transmitted first transmission parameters, a measurement receiving section, that is associated with the initiating communication device, receives first signals issued by the responding communication device.

According to an advantage of the invention, the initiating communication device also includes a parameter receiving device that receives, from the responding communication device, second transmission parameters that can be used by the initiating communication device, and a measurement transmission section that transmits second signals to the responding communication device, in response to the received second transmission parameters.

According to a feature of the invention, the responding communication device additionally includes a parameter indicating device that transmits second transmission parameters to be used by the initiating communication device to said initiating communication device. It is noted that the first transmission parameters are related to at least one of a power level, a frequency bandwidth, a duration, and a carrier density of the communication link.

According to another feature of the invention, the responding communicating device also includes a measurement receiving section that receives transmitted signals, so that the initiating communication device and the responding communication device can perform an exchange of information between respective measurement receiving sections.

According to another object of the invention, an apparatus is disclosed for determining transmission parameters while initializing a communication link. A parameter receiving device that is associated with an initiating communication device receives transmission parameters that can be used by the initiating communication device. A measurement transmission section that is associated with the initiating communication device transmits signals to the responding communication device, in response to the received transmission parameters.

According to an advantage of the invention, the responding communication device also includes a parameter indicating device that transmits, to the initiating communication device, the transmission parameters that can be used by the initiating communication device. The transmission parameters are related to at least one of a power level, a frequency bandwidth, a duration, and a carrier density of the communication link.

According to a further advantage of the invention, the responding communicating device also includes a measurement receiving section that receives the transmitted signals, the initiating communication device and the responding communicating device performing an exchange of information between respective measurement receiving sections.

Another object of the present invention is the disclosure of an apparatus for establishing a communication link using a determined amount of transmission power. A parameter indicating device that is associated with an initiating communication device transmits, to a responding communication device, first transmission parameters that can be used by the responding communication device. A measurement receiving section that is associated with the initiating communication device, receives first signals issued by the responding communication device in response to the first transmission parameters. Then, a selecting device that is associated with the initiating communication device transmits, to the responding communication device, power level parameters that can be used by the responding communication device.

An advantage of the invention is that a parameter receiving device that is associated with the initiating communication device receives, from the responding communication device, second transmission parameters that can be used by the initiating communication device. A measurement transmission section that is associated with the initiating communication device transmits second signals to the responding communication device, and a selecting device, associated with the responding communication device, transmits, to the initiating communication device, power level parameters that can be used by the initiating communication device.

Another advantage of the invention is the inclusion of a configuring device that is associated with the initiating communication device. The configuring device sets power level transmission characteristics to be used by the initiating communication device in response to the transmitted power level parameters.

A still further advantage of the invention is that the initiating communication device and the responding communication device perform a communication link startup procedure after the power level parameter is selected.

Another object of the present invention relates to an apparatus for establishing a communication link using a determined amount of transmission power. A parameter receiving device, associated with an initiating communication device, receives, from a responding communication device, transmission parameters that can be used by the initiating communication device. A measurement transmission section, associated with an initiating communication device, transmits signals to a measurement receiving section of a responding communication device, in response to the transmission parameters. A selecting device, associated with the responding communication device, transmits, to the initiating communication device, power level parameters that can be used by the initiating communication device.

A configuring device that is associated with the initiating communication device may additionally be provided to set power level transmission characteristics to be employed.

A feature of the invention is that the initiating communicating device and the responding communicating device perform a communication link startup procedure after the power level parameter is selected.

A still further object of the invention concerns a method for determining an amount of transmission power to use while establishing a communication link. An initiating communication device transmits a power measurement signal to a responding communication device. The responding communication device acknowledges reception of the power measurement signal, and additionally transmits to the initiating communication device, received power measurement values. The responding communication device the indicates transmission characteristics of the initiating communication device to the initiating communication device. The initiating communication device then utilities the transmission characteristics received from the responding device during a subsequent transmission.

The responding communication device may additionally transmit a signal to the initiating communication device proposing transmission characteristics of the power measurement signal to be received by the responding communication device. A communication link startup procedure may also be initiated after the transmission characteristics has been indicated.

According to a feature of the invention, at least one of an initiation, a parameter, a result, and an acknowledgment is transmitted by digital messages. Additionally, at least a portion of the digital messages may be transmitted at substantially a same time as the power measurement signal.

According to another object of the invention, a method is disclosed for determining frequency dependent amounts of transmission power to use while establishing a communication link. According to the method, an initiating communication device transmits a power measurement signal with characteristics that are frequency dependent to a responding communication device. The responding communication device indicates the frequency dependent transmission characteristics of the initiating communication device to the initiating communication device. The initiating communication device then utilizes the frequency dependent transmission characteristics received from the responding communication device during a subsequent transmission.

According to a feature of the invention, the responding communication device transmits frequency dependent received power measurement values to the initiating communication device. According to another feature of the invention, the responding communication device transmits a signal that proposes the frequency dependent transmission characteristics of the power measurement signal to be received by the responding communication device, to the initiating communication device.

A further object of the invention pertains to a method for determining an amount of transmission power to use while establishing a communication link. A power measurement signal is transmitted from an initiating communication device to a responding communication device, in which the power measurement signal is transmitted at a predetermined power level. The power measurement signal is re-transmitted at incrementally higher power levels (such as, for example, 2 db increments), which may be at predetermined time intervals such as, for example, 200 ms), until the responding communication device issues a signal representing that the power measurement signal was adequately received. A transmit power level is then set for establishing a communication link between the initiating communication link and the responding communication device in response to the signal representing that the power measurement signal was adequately received.

According to a feature of the invention, a communication link startup procedure may be initiated after the transmit power level parameter has been set. It is noted that the transmitted power measurement signal may be encoded as digital messages on a negotiation and control channel that is exchanged between the initiating communication device and the receiving communication device.

An additional object of the invention concerns an apparatus for measuring frequency dependent, power during handshaking of a communication link. An indicating device that is associated with an initiating communication device transmits frequency band transmission parameters (that can be used by the responding communication device), to a responding communication device. A measurement transmission section that is associated with an initiating communication device transmits (to a measurement transmission section of a responding communication device) first signals in such a manner that a power level varies by frequency bands. A measurement receiving section of the initiating communication device receives second signals, in which the power level varies by frequency bands issued by a measurement transmission section of the responding communication device, with the second signals being received in response to the transmitted first signals.

According to a feature of the invention, the first signals may be shaped by a frequency band transmission device that functions to shape the first signals by at least one of a flat filter, a sloped filter, and a b-spline filter.

Another feature of the invention is that the transmitted first signals may be subjected to parameterized templates, so as to allow a non-linear gain.

Another method is disclosed for establishing communication transmission parameters during a communication link initialization, by transmitting, by an initiating communication device (such as, for example, an xTU-R), a first digital message having parameters for a downstream power measurement sequence; transmitting, by a responding communication device (such as, for example, an xTU-C), a second digital message having parameters for an upstream power measurement sequence, and also including substantially the same said parameters of said first digital message as parameters of said second digital message; transmitting, by the initiating communication device, a third digital message that acknowledges the parameters and a mode selected by the responding communication device; transmitting, by the initiating communication device, a power measurement signal that employs the parameters; transmitting, by the responding communication device, the power measurement signal that employs the parameters; transmitting, by the initiating communication device, a fourth digital message containing a result of the power measurement signal transmitted by the responding communication device and a desired power reduction level; transmitting, by the responding communication device, a fifth digital message containing a result of the power measurement signal transmitted by the initiating communication device and the desired power reduction level; exchanging a final operating characteristic between the initiating communication device and the responding communication device to select and/or acknowledge a mode by the initiating communication device and the responding communication device; and, starting a training session of the initiating communication device and the responding communication device.

BRIEF DESCRIPTION OF THE DRAWINGS

The foregoing and other objects, features and advantages of the invention will be apparent from the following more particular description of preferred embodiments, as illustrated in the accompanying drawings which are presented as a non-limiting example, in which reference characters refer to the same parts throughout the various views, and wherein.

DETAILED DESCRIPTION OF PREFERRED EMBODIMENTS

The particulars shown herein are by way of example and for purposes of illustrative discussion of embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the present invention may be embodied in practice.

Preferred embodiments are described in the context of a new message type, procedures, and associated transactions to a startup mechanism (such as, but not limited to, for example, the xDSL startup method defined in ITU-T Recommendation G.994.1). The new message type or session is correctively referred to as Power Measurement Modulation Session (PMMS) and/or "Power Management Exchange" (PME).

PMMS/PME uses digital messages to initiate and configure signals for measuring power for communication devices, to report measurement results, and/or to set power transmission parameters for subsequent transmissions.

The functionality and methodology of using the PMMS and/or PME messages and procedures can also be applied to handshake procedures other than ITU-T Recommendation G.994.1, such as, but not limited to, for example, ITU-T Recommendations V.8 and V.8bis.

Figure 1:
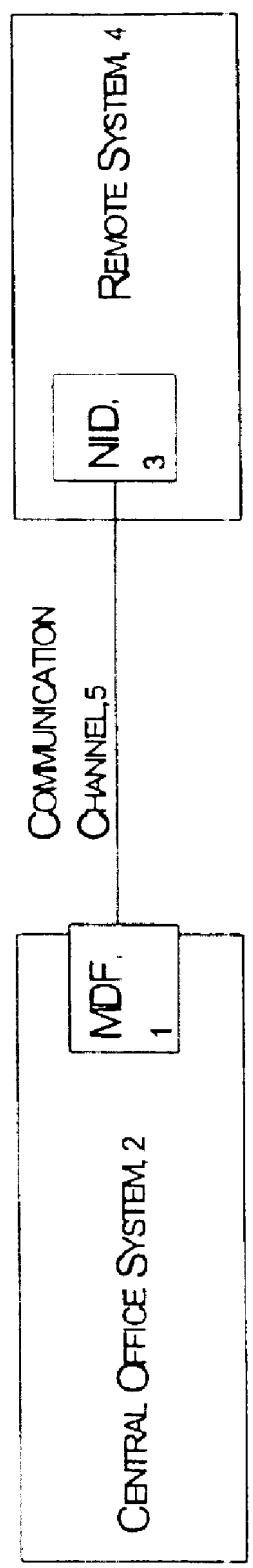
FIG. 1 illustrates a block diagram of a data communication system using a modem device according to an embodiment of the present invention.

The details of a handshake procedure that implements the present invention will be described below. According to the present invention, a data communication system comprises a central office system 2 and a remote system 4, which are interfaced together via a communication channel 5, as shown in FIG. 1.

The central office system 2 includes a main distribution frame (MDF) 1 that functions to interface the central office system 2 to the communication channel 5. The main distribution frame (MDF) 1 operates to connect, for example, telephone lines (e.g., communication channel 5) coming from the outside, on one side, and internal lines (e.g., internal central office lines) on the other side.

The remote system 4 includes a network interface device (NID) 3 that functions to interface the remote system 4 to the communication channel 5. The network interface device (NID) 3 interfaces the customer's equipment to the communications network (e.g., communication channel 5).

It is understood that the present invention may be applied to other communications devices without departing from the spirit and/or scope of the invention. Further, while the present invention is described with reference to a telephone communication system employing twisted pair wires, it is understood that the invention is applicable to other transmission environments, such as, but not limited to, cable communication systems (e.g., cable modems), optical communication systems, wireless systems, infrared communication systems, etc., without departing from the spirit and/or scope of the invention.

Figure 2:
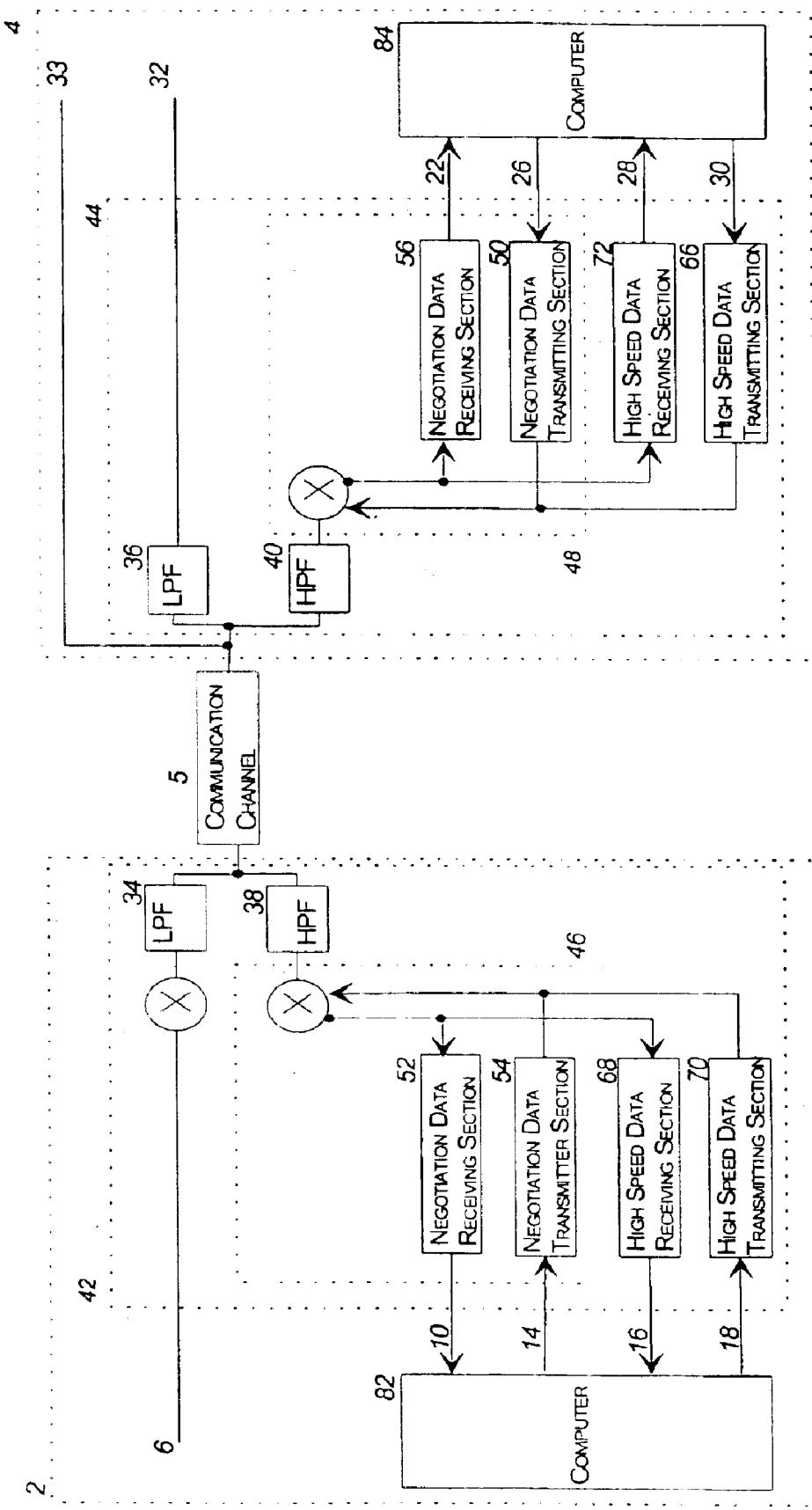
FIG. 2 illustrates a detailed block diagram of a data communication system of FIG. 1.

FIG. 2 illustrates a detailed block diagram of the data communication system of FIG. 1. This communication system represents a typical installation, in which both the central office system 2 and the remote system 4 implement the instant invention.

As shown in FIG. 2, the central office system 2 comprises a low pass filter 34 and a high pass filter 38, a test negotiation block 46, a high speed data receiving section 68, a high speed data transmitting section 70, and a computer 82. Computer 82 is understood to be a generic interface to network equipment located at the central office. Test negotiation block 46 performs all of the negotiation and examination procedures which takes place prior to the initiation of an actual high speed data communication.

The low pass filter 34 and high pass filter 38 function to filter communication signals transferred over the communication channel 5. The test negotiation block 46 tests and negotiates conditions, capacities, etc. of the central office system 2, the remote system 4, and the communication channel 5. The procedures of the test negotiation block 46 are completed prior to, and initiate the selection of the high speed modem receiving and transmitting sections (e.g., modems) 68 and 70. The high speed receiving section 68 functions to receive high speed data transmitted from the remote system 4, while the high speed data transmitting section 70 transmits high speed data to the remote system 4. The high speed sections 68 and 70 may comprise, but not be limited to, for example, ADSL, HDSL, SHDSL, VDSL, CDSL modems. High speed sections 68 and 70 can be a plurality of high speed transmission devices which "share" the common block 46 during the initial negotiation procedure. The negotiation data receiving section 52 and the high speed data receiving section 68 transmit signals to computer 82. The negotiation data transmitting section 54 and the high speed data transmitting section 70 receive signals issued from the computer 82.

Test negotiation block 46 comprises a negotiation data receiving section 52 and a negotiation data transmitting section 54. The negotiation data receiving section 52 receives negotiation data, while the negotiation data transmitting section 54 transmits negotiation data. The operation of the various sections of the central office system 2 will be described, in detail, below.

Remote system 4 comprises a low pass filter 36, a high pass filter 40, a test negotiation block 48, a high speed data receiving section 72, a high speed data transmitting section 66, and a computer 84. Computer 84 is understood to be a generic interface to network equipment located at the remote system. Test negotiation block 48 performs all of the negotiation and examination procedures that take place prior to the actual high speed data communication.

The low pass filter 36 and high pass filter 40 operate to filter communication signals transferred over the communication channel 5. The test negotiation block 48 tests and negotiates conditions, capacities, etc. of the central office system 2, the remote system 4, and the communication channel 5. The high speed receiving section 72 functions to receive high speed data transmitted from the central office system 2, while the high-speed data transmitting section 66 transmits high speed data to the central office system 2. The negotiation data receiving section 56 and the high speed data receiving section 72 transmit signals to the computer 84. The negotiation data transmitting section 50 and the high speed data transmitting section 66 receive signals issued from the computer 84.

The test negotiation block 48 comprises a negotiation data receiving section 56 and a negotiation data transmitting section 50. The negotiation data receiving section 56 receives negotiation data, while the negotiation data transmitting section 50 transmits negotiation data. The operation of the various sections of the remote system 4 will be described, in detail, below.

The negotiation data transmitting section 50 of the remote system 4 transmits the upstream negotiation data to the negotiation data receiving section 52 of the central system 2. The negotiating data transmitting section 54 of the central system 2 transmits the downstream negotiating data to the negotiation data receiving section 56 of the remote system 4.

The central office system 2 includes a plurality of channels 6, 10, 14, 16 and 18 that are used to communicate with a plurality of channels 22, 26, 28, 30 and 32 of the remote system 4. In this regard, it is noted that in the disclosed embodiment, channel 6 comprises a central voice channel that is used to directly communicate with a corresponding remote voice channel 32 in a conventional voice band (e.g., 0 Hz to approximately 4 kHz), which has been filtered by low pass filters 34 and 36. Further, a remote voice channel 33 is provided in the remote system 4 that is not under the control of the central office system 2. Remote voice channel 33 is connected in parallel with the communication channel 5 (but prior to the low pass filter 36), and thus, provides the same service as the remote voice channel 32. However, since this channel is connected prior to the low pass filter 36, the remote voice channel 33 contains both the high speed data signal and a voice signal.

It is noted that the filters may be arranged to have different frequency characteristics, so that a communication may take place using other, low band communication methods, such as, for example, ISDN, between voice channels 6 and 32. The high pass filters 38 and 40 are selected to ensure a frequency spectrum above 4 kHz. It is noted that some systems do not require, nor implement, some (or all) of the filters 34, 36, 38, and 40.

Bit streams 10, 14, 16 and 18 (in the central office system 2) and bit stream 22, 26, 28 and 30 (in the remote system 4) comprise digital bit streams that are used to communicate between the central computer 82 and the remote computer 84, respectively. It is understood that it is within the scope of the present invention that bit streams 10, 14, 16, and 18 could be implemented as discrete signals (as shown), or bundled into an interface, or cable, or multiplexed into a single stream, without changing the scope and/or function of the instant invention. For example, bit streams 10, 14, 16 and 18 may be configured as (but are not limited to) an interface conforming to a RS-232, parallel, FireWire (IEEE-1394), Universal Serial Bus (USB), wireless, or infrared (IrDA) standard. Likewise, it is understood that bit streams 22, 26, 28 and 30 can be implemented as discrete signals (as shown in the drawings), or bundled into an interface, or cable, or multiplexed into a single stream, as described above.

Negotiation data (e.g., control information) corresponding to the condition of the communication line (e.g., frequency characteristics, noise characteristics, presence or absence of a splitter, etc.), capabilities of the equipment, and user and application service requirements is exchanged between the negotiation data receiving section 52 and negotiation data transmitting section 54 of the central office system 2, and the negotiation data receiving section 56 and negotiation data transmitting section 50 of the remote system 4.

The essential features of the hardware portion of the data communication system of FIG. 2 is the functionality contained in the test negotiation blocks 46 and 48, which test and negotiate the conditions, capabilities, etc. of the central office system 2, the remote system 4, and the communication channel 5.

In practice, the configuration of the central office system 2 and the remote system 4 is subject to wide variations. For example, the configuration of the external voice channel 33 is not under the control of the same entities that control the central office system 2. Likewise, the capabilities and configuration of the communication channel 5 are also subject to wide variation. In the disclosed embodiment, test negotiation blocks 46 and 48 are embedded within modems 42 and 44. However, the functionality of test negotiation blocks 46 and 48 may, alternatively, be implemented separate and distinct from the modems 42 and 44. Signals transmitted and received between the test negotiation blocks 46 and 48 are used for testing the environment itself as well as communicating the results of the tests between the central office system 2 and the remote system 4.

The purpose of each signal path in FIG. 2 will be explained followed by an explanation of the devices used to create the signals. Examples of specific values for the various frequencies will be discussed in detail, below.

In the communication system shown in FIG. 2, frequency division multiplexing (FDM) is utilize for various communication paths to exchange information between the central office system 2 and the remote system 4. However, it is understood that other techniques (such as, but not limited to, for example, CDMA, TDMA, spread spectrum, etc.) may be used without departing from the spirit and/or scope of the present invention.

The range from frequency 0 Hz until frequency 4 kHz is typically referred to as the PSTN voice band. Some of the newer communication methods typically attempt to use the frequency spectrum above 4 kHz for data communication. Typically, the first frequency where transmission power is allowed occurs at approximately 25 kHz. However, any frequency may be used. In this regard, it is noted that tone bursts at a frequency of 34.5 kHz are used to initiate T1E1 T1.413 ADSL modems. As a result, if possible, that frequency should be avoided in the spectrum used by precursor negotiation methods.

The communication paths are defined in pairs, one path for an upstream communication from the remote system 4 to the central office system 2, and another path for a downstream communication from the central office system 2 to the remote system 4. The negotiation upstream bits are transmitted by the negotiation data transmitting section 50 of the remote system 4, and received by the negotiation data receiving section 52 of the central office system 2. The negotiation downstream bits are transmitted by the negotiation data transmitting section 54 of the central office system 2, and received by the negotiation data receiving section 56 of the remote system 4. Once the negotiation and high speed training has been completed, the central office system 2 and the remote system 4 use high speed data transmitting sections 66 and 70, and high speed data receiving sections 72 and 68 to perform a duplex communication.

Messages are sent with one or more carriers, using, for example, a Differential (Binary) Phase Shift Keying (DPSK) modulation. The transmit point is rotated 180 degrees from the previous point if the transmit bit is a 1, and the transmit point is rotated 0 degrees from the previous point if the transmit bit is a 0. Each message is preceded by a point at an arbitrary carrier phase. The frequencies of the carriers, and the procedures for starting the modulation of carriers and messages, will be described below.

Great lengths are taken, both before the handshake procedure is performed and during the handshake procedure, to be spectrally polite (e.g., as non-obtrusive as possible). Carriers are typically selected so as to be different for the upstream and downstream paths, avoid existing system activation tones, be reasonably robust against intermodulation products, have sufficient spacing, etc. Some suitable sets of carrier tones using 4.3125 kHz and 4.0 kHz base frequencies, are shown in Table 1, below:

TABLE 1

| Signal Designation | Upstream Frequency Indices (N) | Downstream Frequency Indices (N) |
| --- | --- | --- |
| A43 | 9 17 25 | 40 56 64 |
| B43 | 37 45 53 | 72 88 96 |
| C43 | 7 9 | 12 14 64 |
| A4 | 3 | 5 |
| B4 | 4 28 34 | 66 67 76 |

After the remote system 4 analyzes the equipment capabilities, the application desires, and the channel limitations, a final decision is made with respect to the communication method to use.

After the central office system 2 has received the final decision, the transmission of the negotiation downstream data is stopped. When the remote system 4 detects the loss of energy (carrier) from the central office system 2, the remote system 4 stops transmitting the negotiation upstream data. After a short delay, the negotiated communication method begins it's initialization procedures.

When initiating a high speed communication'session, one of the central office or remote systems transmits signals that are received by the opposite system that responds by transmitting predetermined signals, such as, for example, signals required in a handshake session. These signals compromise one of a half duplex or fill duplex start-up procedure. An example of such a start-up procedure is described in Applicant's application Ser. No. 09/473,683, filed on Dec. 29, 1999, the disclosure of which is expressly incorporated by reference herein in its entirety. The start-up procedure establishes a bi-directional communication channel for use by a handshake session. Other examples of handshake sessions include, but are not limited to, ITU-T Recommendations V.8, V.8bis, and G.994.1 (formerly referred to as G.hs).

After the handshake session has been initiated, and before it is terminated, one or more transactions are used to exchange data between the xTU-C and the xTU-R Each transaction consists of one (or more) messages that contain data and/or requests, and then concludes with an acknowledgment message (or, alternatively, a negative-acknowledgment message).

The messages include, but are not limited to, mode select, capabilities exchange, requests to defer, requests for power management procedures and the results of those processes.

The unit responding to a message indicates an acceptance (with an acknowledgment message), a rejection (with a negative-acknowledgment message), or a desire to initiate a different type of message with a request message. Depending on the response, a unit may initiate another transaction or terminate the handshake session. An acknowledgment to a mode selection message will cause the handshake session to be terminated, and the communication mode selected in the mode selection message to be initiated, using known techniques.

In the discussion of the invention to follow, messages use the frame structure set forth in ITU-T Recommendation G.994.1, noted above. However, it is understood that alternative frame structures can be employed without departing from the spirit and/or scope of the invention.

The information content of the messages must be encoded in a consistent, scalable, and extensible manner so as to promote interoperability among equipment and compatibility with future equipment and services. The prior art (e.g., V.8, V.8bis) provides general examples of means to frame and format handshaking data Handshaking for xDSL modems also require the transmission of new data types, such as variables and multiple resolution parameters. Examples of encoding mechanism are given below in Tables 2 through 4. Specific names and encodings of parameters are dependent on the particular high speed communication system being used Table 2 illustrates the format for encoding a small integer variable:

TABLE 2

| Number Of Segments Octet | | | | | | | | |
|---|---|---|---|---|---|---|---|---|
| Segments NPar(3)s | 8 | 7 | 6 | 5 | 4 | 3 | 2 | 1 |
| Unspecified by terminal | x | x | 0 | 0 | 0 | 0 | 0 | 0 |
| Number of segments (bits 6-1) | x | x | x | x | x | x | x | x |
| Reserved | x | x | 1 | 1 | 1 | 1 | 1 | 1 |

Table 3 illustrates the format for encoding a variable with a range larger than the number of bits:

TABLE 3

| Duration Octet | | | | | | | | |
|---|---|---|---|---|---|---|---|---|
| Data rate NPar(3)s | 8 | 7 | 6 | 5 | 4 | 3 | 2 | 1 |
| Duration (bits 6-1 × 5 ms) | x | x | x | x | x | x | x | x |
| Reserved | x | x | 1 | 1 | 1 | 1 | 1 | 1 |

Table 4 illustrates the format for encoding a parameter with multi-resolutions. Bit 6 is used to indicate a multiplying factor for bits 1 through 5. Additionally, a special code is used to indicate a data rate that is not a multiple of 32 kbit/sec (or 64 kbit/sec).

TABLE 4

| Training Parameters - Octet 2 - NPar(3) Coding | | | | | | | | |
|---|---|---|---|---|---|---|---|---|
| Data rate NPar(3)s | 8 | 7 | 6 | 5 | 4 | 3 | 2 | 1 |
| Unspecified by terminal | x | x | 0 | 0 | 0 | 0 | 0 | 0 |
| Data rate (bits 5-1 × 32 kbit/s) | x | x | 0 | x | x | x | x | x |
| Data rate (bits 5-1 × 64 kbit/s + 1024 kbit/s) | x | x | 1 | x | x | x | x | x |
| Data rate 1544 kbit/s | x | x | 1 | 1 | 1 | 1 | 1 | 0 |
| Reserved | x | x | 1 | 1 | 1 | 1 | 1 | 1 |

Various power measurement transactions are described below, along with their associated messages and message contents. While the description provided below is set forth with respect to xDSL communication protocols, it is understood that the present invention is equally applicable to communication systems such as, but not limited to, cable modems, satellite communication systems, point-to-point wired or wireless communication systems, etc.

First Embodiment

A first embodiment is described in the context of a new transaction to an xDSL startup mechanism (such as, but not limited to, for example, ITU-T Recommendation G.994.1, noted above). The new transaction is referred to as "Power Management Exchange" (PME). It is noted that the functionality and methodology of the PME is the same for other handshake procedures, such as, but not limited to, for example, ITU-T Recommendations V.8 and V.8bis.

Table 5 illustrates the new transaction presented in conjunction with a fill duplex modulation negotiation communication channel, and assumes that the first message is always sent by the HSTU-R.

TABLE 5

| PME Full Duplex Transaction | | |
|---|---|---|
| Transmitter | Message Name | Description |
| HSTU-R | PR | The message: is a request for the HSTU-C to send the power measurement signals (PM$_C$), and includes the parameters of the desired signal (PM$_C$) to be transmitted. |
| HSTU-C | P1 | This message includes: the parameters of the PM$_C$ signal actually transmitted (in |

TABLE 5-continued

PME Full Duplex Transaction

| Transmitter | Message Name | Description |
|---|---|---|
| | | case it cannot comply with the full request of the HSTU-R) the parameters of the $PM_R$ signal it desires the ATU-R to transmit. Simultaneously, the HSTU-C transmits the power measurement signal ($PM_C$) for the HSTU-R to receive. If the ATU-C does not wish to receive power measurement signals, it can also indicate that here. |
| HSTU-R | P2 | This message: acknowledges the reception of the power measurement signal ($PM_C$) during P1; transmits power level parameters to be used the HSTU-C, includes the parameters of the $PM_R$ signal actually transmitted (in case it cannot comply with the full request of the HSTU-C). Simultaneously, the HSTU-R transmits the power management signal $PM_R$ if it was requested by the HSTU-C. |
| HSTU-C | P3 | This message: acknowledges the reception of the power measurement signal ($PM_R$) during P2; and transmits power level parameters to be used in the HSTU-R. |
| HSTU-R | ACK(1) | The message acknowledges the reception of P3 |

The nature of the power measurement signals $PM_R$ and $PM_C$ are such that they do not interfere with the simultaneous transmission of the digital negotiation and control channels. Parameters that describe $PM_R$ and $PM_C$ include bandwidth, duration, power levels, density of carriers, etc.

Table 6 illustrates the new transaction in conjunction with a half duplex modulation negotiation communication channel. In the following disclosure, it is assumed that the first message is always sent by the HSTU-R. The test signals $PM_C$ and $PM_R$ do not need to be sent concurrently with messages.

TABLE 6

PME Half Duplex Transaction

| Transmitter | Message Name | Description |
|---|---|---|
| HSTU-R | PRR | The message: is a request for the HSTU-C to send the power measurement signals ($PM_C$), and includes the parameters of the desired signal ($PM_C$) to be transmitted. |
| HSTU-C | PRH | This two part message includes: the actual parameters of the $PM_C$ signal to be transmitted (in case it cannot comply with the full request of the HSTU-R) communicated via the control communication channel and terminates the modulation. Then, the HSTU-C transmits the power measurement signal ($PM_C$) for the HSTU-R to receive. |
| HSTU-R | PRHA | This message is transmitted via the control communication channel: acknowledges the reception of the power measurement signal ($PM_C$) during PRH; and transmits power level parameters to be used in the HSTU-C. |
| HSTU-C | PCR | The message: is a request for the HSTU-R to send the power measurement signals ($PM_R$), and includes the parameters of the desired signal ($PM_R$) to be transmitted. |
| HSTU-R | PCH | This two part message includes: the actual parameters of the $PM_R$ signal to be transmitted (in case it cannot comply with the full request of the HSTU-C) communicated via the control communication channel and terminates the modulation. Then, the HSTU-R transmits the power measurement signal ($PM_R$) for the HSTU-C to receive. |

TABLE 6-continued

PME Half Duplex Transaction

| Transmitter | Message Name | Description |
|---|---|---|
| HSTU-C | PCHA | This message: acknowledges the reception of the power measurement signal ($PM_R$) during PCH; and transmits power level parameters to be used in the HSTU-R for the HSTU-CR. |
| HSTU-R | ACK(1) | The message acknowledge the reception of PCHA |

It is noted that the instant invention also permits manufacturers to utilize their own proprietary signals that are transmitted instead of using standard signals $PM_R$ and $PM_C$. The use of the proprietary signal is indicated in messages PRR and PCR Second Embodiment The instant invention will now be described with respect to an xDSL startup mechanism disclosed in, for example, Applicants application Ser. Nos. 09/217,556 and 09/281,813.

The Power Management Exchange (PME) comprises two types of elements: (1) digital negotiation and control channels; and (2) power measurement signals. Parameters that describe power measurement signals are negotiated and indicated as messages in the negotiation and control channels of the PME. After the power measurement signals are received and analyzed, preferred transmit levels are indicated in messages to the opposite side.

A PME transaction initially transmits the power measurement signals at the lowest possible level. The PME transaction may be repeated at incrementally higher power levels if the signals were not adequately received. Loop attenuation and minimum necessary transmit power is calculated by subtracting the measured receive power of the signals from the transmit power indicated in the messages of the PME.

As noted above, the functionality and methodology of using the PME procedure can also be applied to other handshake procedures such as but not limited to ITU-T Recommendations V.8 and V.8bis.

A. Full Duplex Modulation

Figure 3:
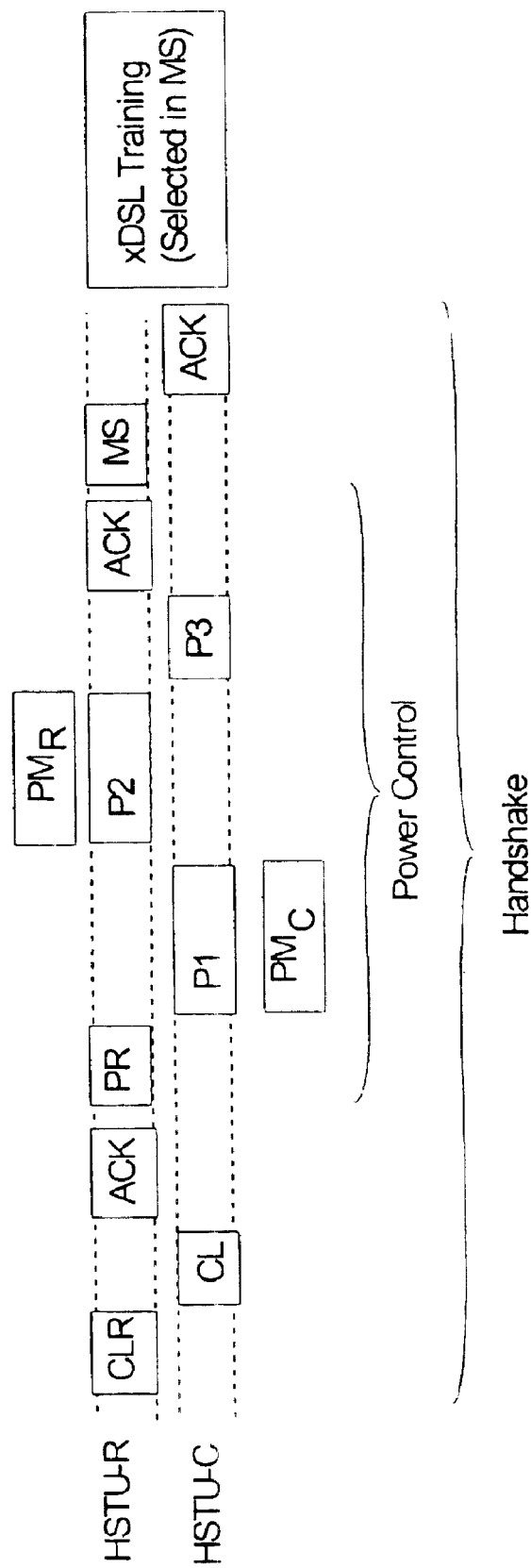
FIG. 3 illustrates a Power Management Exchange (PME) full duplex transaction using new message types and transactions according to the present invention.

A PME full duplex transaction of this embodiment corresponds to the transaction listed in Table 5, above, and illustrated in FIG. 3.

The parameters are encoded in digital messages on the negotiation and control channels that are exchanged between the HSTU-R and HSTU-C. $PM_X$ bandwidth is indicated by setting nonzero power levels on the desired carriers in the spectrum of interest. Although a prescribed number of carriers are defined, the density of the carriers can be reduced by setting the transmit power level of individual carriers to zero. The power level of each carrier is encoded by bits that include codes for zero and nominal power. The requested measurement duration is encoded in a time expressed in milliseconds.

The HSTU-R makes power measurements based on the signals in P1 and $PM_C$. The signals in P1 are the carriers of the HSTU-C message modulation. The minimum number of carriers is based upon the types of xDSL modems (e.g., ADSL, SDL, CDSL, HDSL, VDSL, etc.) included in a particular communication loop. HSTU-C message modulation carriers are shown in the last column of Tables 7 and 8, below. $PM_C$ allows measurement of the power of the downstream spectrum in areas outside of the carriers of P1. P1 is composed from carriers in at least one of A43, B43, C43, and A4. $PM_C$ is composed from P4 and V128 carriers, or P43 and V138 carriers. Carrier sets are described in Tables 7 through 10, below.

The HSTU-C makes power measurements based on the signals in P2 and $PM_R$. The signals in P2 are the carriers of the HSTU-R message modulation. The minimum number of carriers is based upon the types of xDSL modems included in a particular embodiment of the invention. HSTU-R message modulation carriers are shown in the middle column of Tables 7 and 8, below. $PM_R$ allows measurement of the power of the upstream spectrum in areas outside of the carriers of P2. P2 is composed from carriers in at least one of A43, B43, C43, and A4. $PM_R$ is composed from P4 and V128 carriers or P43 and V138 carriers.

TABLE 7

ADSL Band 4.3125 kHz Carrier Indices

| Carrier set designation | HSTU-R Upstream carrier sets Frequency indices (N) × 4.3125 kHz | HSTU-C Downstream carrier sets Frequency indices (N) × 4.3125 kHz |
|---|---|---|
| A43 | 9 17 25 | 40 56 64 |
| B43 | 37 45 53 | 72 88 96 |
| C43 | 7 9 | 12 14 64 |
| P43 | — | 115 138 165 198 238 255 |

TABLE 8

ADSL Band 4 kHz Carrier Indices

| Carrier set designation | HSTU-R Upstream carrier sets Frequency indices (N) × 4 kHz | HSTU-C Downstream carrier sets Frequency indices (N) × 4 kHz |
|---|---|---|
| A4 | 3 | 5 |
| P4 | 10, 12, 14, 17, 20, 24, 29, 34, 41, 50, 59, 71, 86, 103, 123, 148, 177, 213, 255 | 10, 12, 14, 17, 20, 24, 29, 34, 41, 50, 59, 71, 86, 103, 123, 148, 177, 213, 255 |

TABLE 9

VDSL Band 128 kHz Carrier Indices

| Carrier set designation | HSTU-R Upstream carrier sets Frequency indices (N) × 128.0 kHz | HSTU-C Downstream carrier sets Frequency indices (N) × 128.0 kHz |
|---|---|---|
| V128 | 10, 12, 14, 17, 20, 24, 29, 34, 41, 50, 59, 71, 86, 103, 123, 148, 177, 213, 255 | 10, 12, 14, 17, 20, 24, 29, 34, 41, 50, 59, 71, 86, 103, 123, 148, 177, 213, 255 |

TABLE 10

VDSL Band 138 kHz Carrier Indices

| Carrier set designation | HSTU-R Upstream carrier sets Frequency indices (N) × 138.0 kHz | HSTU-C Downstream carrier sets Frequency indices (N) × 138.0 kHz |
|---|---|---|
| V138 | 8, 10, 12, 14, 17, 20, 24, 29, 34, 41, 50, 59, 71, 86, 103, 123, 148, 177, 213 | 8, 10, 12, 14, 17, 20, 24, 29, 34, 41, 50, 59, 71, 86, 103, 123, 148, 177, 213 |

For the band which occupies the spectrum up to approximately 1.1 MHz (typically referred to as the ADSL band), a carrier indexing method is used. For the band from approximately 1.1 MHz through approximately 30 MHz (typically referred to as the VDSL band), an indexing method is also used, but the carriers have a spacing of 128.0 kHz or 138.0 kHz. The VDSL band carrier spacing is 32 times the ADSL band carrier spacing to roughly scale the approximately 27 times bandwidth increase. It is noted that the first eight indices of the VDSL band carriers are not used because they overlap the ADSL band carriers. The V128 set of carriers shown in Table 9, above, is for systems that prefer 4.0 kHz spacing.

The V138 set of carriers shown in Table 10, above, is for systems that prefer 4.3125 kHz spacing. The spacing of the carriers is selected to be approximately 1.2 times the previous carrier. This allows a non-linear set of carriers that scales equivalent with frequency.

Power levels are expressed in 3 bits, as shown in Table 11, below. The power level for each carrier in the ADSL 4.3125 kHz band is coded in Table 12, below. The power level for each carrier in the ADSL 4.0 kHz band is coded in Table 13, below. The power level for each carrier in the VDSL band is coded in Table 14.

The definition of the VDSL band power measurement carriers is effective for all types of VDSL band modulation schemes, including, but not limited to, single-carrier modulation schemes, and multi-carrier modulation schemes. It is noted that other carrier spacings and widths may be used without departing from the spirit and/or scope of this invention.

TABLE 11

Power Level Encoding Bits

| Code | Description |
|---|---|
| 000 | not transmitted |
| 001 | −60 dBm (per carrier) |
| 010 | −50 dBm (per carrier) |
| 011 | −40 dBm (per carrier) |
| 100 | −30 dBm (per carrier) |
| 101 | −20 dBm (per carrier) |
| 110 | −10 dBm (per carrier) |
| 111 | Nominal |

TABLE 12

ADSL Band 4.3125 kHz Carrier Transmit Power {NPar(2)} Coding

| | Power | | 8 | 7 | 6 | 5 | 4 | 3 | 2 | 1 |
|---|---|---|---|---|---|---|---|---|---|---|
| Octet #1 | #009 | #012 | x | x | x | x | x | x | x | x |
| Octet #2 | #014 | #017 | x | x | x | x | x | x | x | x |
| Octet #3 | #025 | #037 | x | x | x | x | x | x | x | x |
| Octet #4 | #040 | #045 | x | x | x | x | x | x | x | x |
| Octet #5 | #053 | #056 | x | x | x | x | x | x | x | x |
| Octet #6 | #064 | #072 | x | x | x | x | x | x | x | x |
| Octet #7 | #088 | #096 | x | x | x | x | x | x | x | x |
| Octet #8 | #115 | #138 | x | x | x | x | x | x | x | x |
| Octet #9 | #165 | #198 | x | x | x | x | x | x | x | x |
| Octet #10 | #238 | #255 | x | x | x | x | x | 1 | 1 | 1 |

TABLE 13

ADSL Band 4.0 kHz Carrier Transmit Power {NPar(2)} Coding

| | Power | | 8 | 7 | 6 | 5 | 4 | 3 | 2 | 1 |
|---|---|---|---|---|---|---|---|---|---|---|
| Octet #1 | #003 | #005 | x | x | x | x | x | x | x | x |
| Octet #2 | #008 | #010 | x | x | x | x | x | x | x | x |
| Octet #3 | #012 | #014 | x | x | x | x | x | x | x | x |
| Octet #4 | #017 | #020 | x | x | x | x | x | x | x | x |
| Octet #5 | #024 | #029 | x | x | x | x | x | x | x | x |
| Octet #6 | #034 | #041 | x | x | x | x | x | x | x | x |
| Octet #7 | #050 | #059 | x | x | x | x | x | x | x | x |
| Octet #8 | #071 | #086 | x | x | x | x | x | x | x | x |
| Octet #9 | #103 | #123 | x | x | x | x | x | x | x | x |
| Octet #10 | #148 | #177 | x | x | x | x | x | x | x | x |
| Octet #11 | #213 | #255 | x | x | x | x | x | 1 | 1 | 1 |

TABLE 14

VDSL Band Carrier Transmit Power {NPar(2)} Coding

| | Power | | 8 | 7 | 6 | 5 | 4 | 3 | 2 | 1 |
|---|---|---|---|---|---|---|---|---|---|---|
| Octet #1 | #008 | #010 | x | x | x | x | x | x | x | x |
| Octet #2 | #012 | #014 | x | x | x | x | x | x | x | x |
| Octet #3 | #017 | #020 | x | x | x | x | x | x | x | x |
| Octet #4 | #024 | #029 | x | x | x | x | x | x | x | x |
| Octet #5 | #034 | #041 | x | x | x | x | x | x | x | x |
| Octet #6 | #050 | #059 | x | x | x | x | x | x | x | x |
| Octet #7 | #071 | #086 | x | x | x | x | x | x | x | x |
| Octet #8 | #103 | #123 | x | x | x | x | x | x | x | x |
| Octet #9 | #148 | #177 | x | x | x | x | x | x | x | x |
| Octet #10 | #213 | #255 | x | x | x | x | x | 1 | 1 | 1 |

The contents of the Messages are shown in Tables 15 through 18, below.

TABLE 15

PR Message Content

Message type field - PR
Revision number field
P1 and PM_C signal duration (in ms)
P1 and PM_C ADSL band power transmission request (using Table 12 or 13)
PM_C VDSL band power transmission request (using Table 14)

TABLE 16

P1 Message Content

Message type field - P1
Revision number field
P2 and $PM_R$ signal duration (in ms)
P1 and $PM_C$ ADSL band power transmission indication
(using Table 12 or 13)
P1 and $PM_C$ VDSL band power transmission indication (using Table 14)
P2 and $PM_R$ ADSL band power transmission request
(using Table 12 or 14)
P2 and $PM_R$ VDSL band power transmission request (using Table 14)

TABLE 17

P2 Message Content

Message type field - P2
Revision number field
P2 and $PM_R$ ADSL band power transmission indication
(using Table 12 or 13)
P2 and $PM_R$ VDSL band power transmission indication
(using Table 14)
HSTU-C transmission power level parameters

TABLE 18

P3 Message Content

Message type field - P3
Revision number field
HSTU-R transmission power level parameters

B. Half Duplex Modulation

The invention will now be described in conjunction with a half duplex modulation negotiation communication channel. It is noted that test signals $PM_{CH}$ and $PM_{RH}$ do not need to be sent concurrently with messages.

Figure 4:
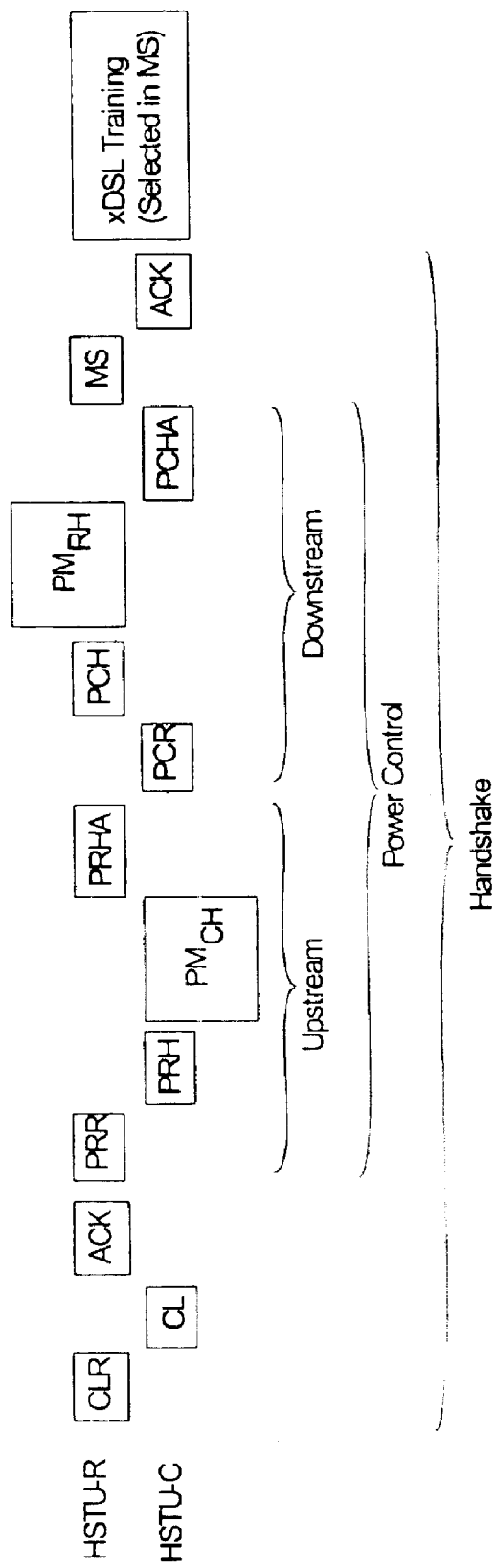
FIG. 4 illustrates a PME half duplex transaction using new message types and transactions according to the instant invention.

The PME half duplex transaction is listed in Table 19, below, and illustrated in FIG. 4. The first message is assumed to always be sent by the HSTU-R. The following discussion assumes that the band descriptions provided above apply.

TABLE 19

PME Half Duplex Transaction

| Transmit Unit | Message Name | Description |
| --- | --- | --- |
| HSTU-R | PRR | The message:<br>is a request for the HSTU-C to send the power measurement signals ($PM_{CH}$) includes the parameters of the desired signal ($PM_{CH}$) to be transmitted. |
| HSTU-C | PRH | This two part message includes:.<br>the actual parameters of the $PM_{CH}$ signal to be transmitted (in case it cannot comply with the full request of the HSTU-R) communicated via the control communication channel and terminates the modulation.<br>Then, the HSTU-C transmits the power measurement signal ($PM_{CH}$) for the HSTU-R to receive. |
| HSTU-R | PRHA | This message is transmitted via the control communication channel: acknowledges the reception of the power measurement signal ($PM_{CH}$) during PRH; and<br>transmits power level parameters to be used in the HSTU-C. |
| HSTU-C | PCR | The message:<br>is a request for the HSTU-R to send the power measurement signals ($PM_{RH}$); and<br>includes the parameters of the desired signal ($PM_{RH}$) to be transmitted. |
| HSTU-R | PCH | This two part message includes:<br>the actual parameters of the $PM_R$ signal to be transmitted (in case it cannot comply with the full request of the HSTU-C) communicated via the control communication channel and terminates the modulation.<br>Then, the HSTU-R transmits the power measurement signal ($PM_{RH}$) for the HSTU-C to receive. |
| HSTU-C | PCHA | This message:<br>acknowledges the reception of the power measurement signal ($PM_{RH}$) during PCH; and<br>transmits power level parameters to be used in the HSTU-R for the HSTU-CR. |
| HSTU-R | ACK(1) | The message acknowledge the reception of PCHA. |

The nature of the power measurement signals $PM_{RH}$ and $PM_{CH}$ are allowed complete freedom, as they need not be concerned with the simultaneous transmission of the digital negotiation and control channels. Parameters that describe $PM_{RH}$ and $PM_{CH}$ include bandwidth, duration, power levels, density of carriers, etc.

The HSTU-R makes a power measurement based on the signals in $PM_{CH}$. The minimum number of carriers is based upon the types of xDSL modems included in a particular communication system. $PM_{CH}$ comprises carriers from at least one of A43, B43, C43, A4, P4 or P43, and V128 or V138 carriers shown in Tables 7 through 10, above.

The HSTU-C makes the power measurement based on the signals in $PM_{RH}$. The minimum number of carriers is based upon the types of xDSL modems included in a particular communication system. $PM_{RH}$ comprises carriers from at least one of A43, B43, $C_{43}$, $A_4$, $P_4$ or $P_{43}$, and $V_{128}$ $_V138$ carriers shown in Tables 7 through 10, above.

The contents of the Messages are shown in Tables 20 through 25, below.

TABLE 20

PRR Message Content

Message type field - PRR
Revision number field
$PM_{CH}$ signal duration (in ms)
Non Standard (NS) request = 0
$PM_{CH}$ ADSL band power transmission request
(using Table 12 or Table 13)
$PM_{CH}$ VDSL band power transmission request
(using Table 14)

TABLE 21

PRH Message Content

Message type field - PRH
Revision number field
$PM_{CH}$ ADSL band power transmission indication
(using Table 12 or Table 13)
$PM_{CH}$ VDSL band power transmission indication
(using Table 14)

TABLE 22

PRHA Message Content

Message type field - PRHA
Revision number field
HSTU-C transmission power level parameters

TABLE 23

PCR Message Content

Message type field - PCR
Revision number field
$PM_{RH}$ signal duration (in ms)
Non Standard (NS) request = 0
$PM_{RH}$ ADSL band power transmission request
(using Table 12 or Table 13)
$PM_{RH}$ VDSL band power transmission request
(using Table 14)

TABLE 24

PCH Message Content

Message type field - PCH
Revision number field
$PM_{RH}$ ADSL band power transmission indication
(using Table 12 or Table 13)
$PM_{RH}$ VDSL band power transmission indication
(using Table 14)

TABLE 25

PCHA Message Content

Message type field - PCHA
Revision number field
HSTU-R transmission power level parameters C. Proprietary Measurement Signals As noted above, the present invention allows manufacturers to utilize (generate) their own proprietary signals that are transmitted (sent) instead of $PM_R$ and $PM_C$ (or $PM_{RH}$ and $PM_{CH}$), while retaining a uniform negotiation and indication structure as the defined test signals. The use of the proprietary power measurement signal is indicated in messages PRR and PCR by setting the Non-Standard request to 1, as shown in Tables 26 and 29, below. Tables 27 and 30, below, illustrate that the parameters of the transmitted signals are indicated using a private (e.g., proprietary) encoding scheme. The parameter and acknowledge messages shown in Tables 28 and 31, below, are the same as Tables 22 and 25 in the half duplex modulation negotiation communication channel, discussed above.

It is noted that the band descriptions as assumed to be the same as previously discussed above.

TABLE 26

PRR Message Content

Message type field - PRR
Revision number field
$PM_{CH}$ signal duration (in ms)
Non Standard (NS) request = 1
Proprietary Parameters (private encoding)

TABLE 27

PRH Message Content

Message type field - PRH
Revision number field
Proprietary Parameters (private encoding)

TABLE 28

PRHA Message Content

Message type field - PRHA
Revision number field
HSTU-C transmission power level parameters

TABLE 29

PCR Message Content

Message type field - PCR
Revision number field
$PM_{RH}$ signal duration (in ms)
Non Standard (NS) request = 1
Proprietary Parameters (private encoding)

TABLE 30

PCH Message Content

Message type field - PCH
Revision number field
Proprietary Parameters (private encoding)

TABLE 31

PCHA Message Content

Message type field - PCHA
Revision number field
HSTU-R transmission power level parameters Third Embodiment A third embodiment of the invention will now be described as procedures for a session comprising existing messages (e.g. MS, MR) and transactions for the digital control provided to request the transmission of the power measurement modulation session signals. The MS message includes explicit details on the parameters of a desired signal (e.g., $PM_{CH}$) to be transmitted. It is noted that the following discussion may be implemented using either full duplex or half duplex modulation procedures. As discussed above, the PMMS initially sends the power measurement signals at the lowest possible power level, which may be repeated at higher power levels if the signals were not adequately received. However, it is understood that the invention is not limited to an initial transmission using the lowest possible power level; that is, the initial transmission may be initiated using any desired, predetermined power level.

A. Fixed Measurement Signals with Standard Measurements

Figure 5:
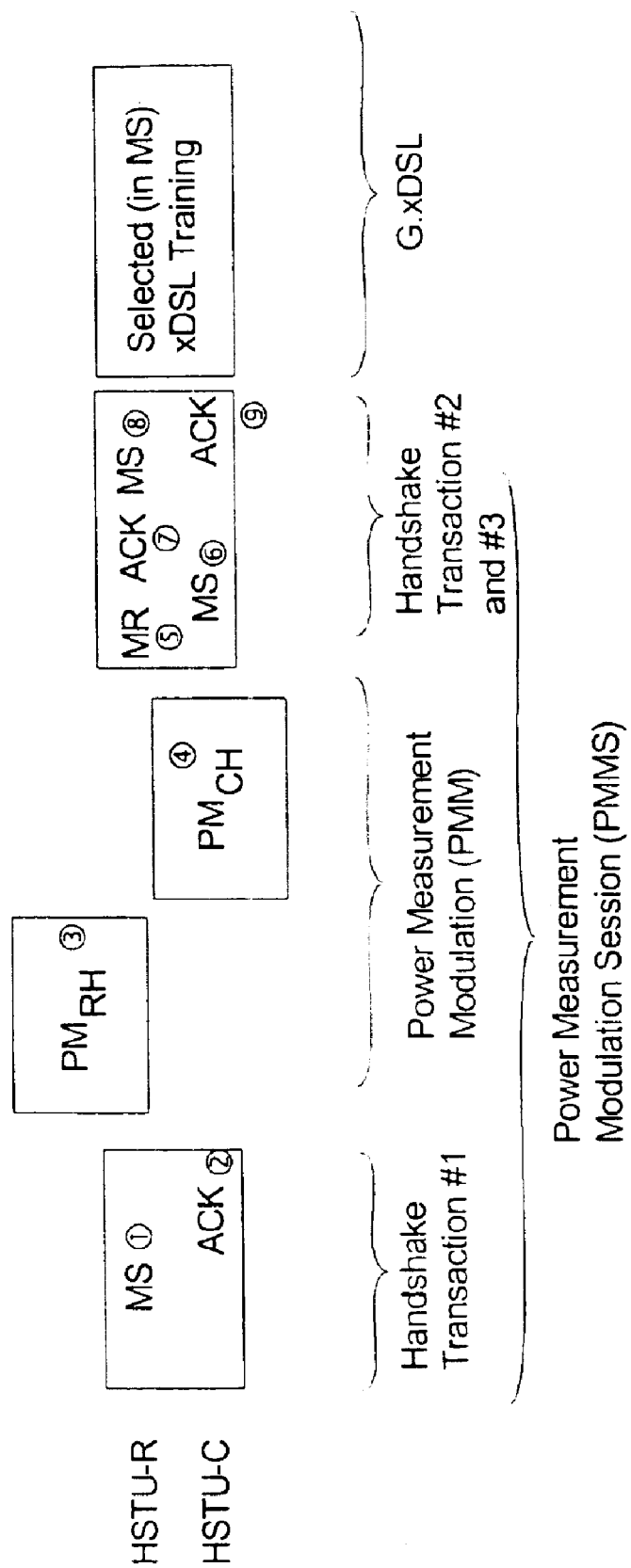
FIG. 5 illustrates a Power Measurement Modulation Session (PMMS) of the instant invention using existing messages and transactions with a predetermined set of parameters for the measurement signal.

The following description of the PMMS is provided with respect to a fixed set of prefabricated measurement signals. The transactions and signal exchange is listed in Table 32, below, and illustrated in FIG. 5. It is assumed that the first message is always sent by the HSTU-R

TABLE 32

PMMS (Standard Measurements)

| Transmit Unit | Message/ Signal Name | # | Description |
|---|---|---|---|
| HSTU-R | MS | 1 | The message: is a request for the HSTU-C and HSTU-R to send the power measurement modulation session (PMMS) signals ($PM_{CH}$ and $PM_{RH}$); and includes the category choice which represents the parameters of the desired signal ($PM_{CH}$ and $PM_{RH}$) to be transmitted |
| HSTU-C | ACK | 2 | The message Acknowledges selection of PMMS |
| HSTU-R | $PM_{RH}$ | 3 | This signal allows the HSTU-C to measure the line conditions and power loss |
| HSTU-C | $PM_{CH}$ | 4 | This signal allows the HSTU-R to measure the line conditions and power loss |
| HSTU-R | MR | 5 | The message: is a request to the HSTU-C to send an MS. |
| HSTU-C | MS | 6 | The message: conveys the upstream PBO request |
| HSTU-R | ACK | 7 | The message Acknowledges the upstream PBO request value |
| HSTU-C | MS | 8 | The message: is a request for a specific xDSL modulation mode, and contains a parameter request a certain amount of PBO in the downstream direction |
| HSTU-C | ACK | 9 | The message Acknowledges selection of the xDSL using the specified downstream PBO |
| — | Training | — | Training begins |

As indicated above, the exchanged parameters are encoded in digital messages on the negotiation and control channels that are exchanged between the HSTU-R and HSTU-C. The HSTU-R makes power measurements based on the signals in $PM_{CH}$. The minimum number of carriers is based upon the types of xDSL modems (e.g., ADSL, CDSL, HDSL, etc.) included in a communication loop. $PM_{CH}$ is composed from carriers in at least one of A43, B43, C43, A4, P4 or P43, and V128 or V138 carriers shown in Tables 33 through 36, below. Similarly, $PM_{CH}$ can be composed from a type of specifiable broadband signal.

The HSTU-C makes power measurements based on the signals in $PM_{RH}$. The minimum number of carriers is based upon the types of xDSL modems included in the communication loop. $PM_{RH}$ is composed from carriers in at least one of A43, B43, C43, A4, P4 or P43 and V128 or V138 carriers shown in Tables 33 through 36. Similarly, $PM_{RH}$ can be composed from a type of specifiable broadband signal.

HSTU-R message modulation carriers can use any, some, or all of the carriers listed in the middle column of Tables 33 through 36. Similarly, the HSTU-C message modulation carriers can use any, some, or all of carriers listed in the right column of Tables 33 through 36.

TABLE 33

ADSL Band 4.3125 kHz Carrier Indices

| Carrier set designation | HSTU-R Upstream carrier sets Frequency indices (N) × 4.3125 kHz | | | HSTU-C Downstream carrier sets Frequency indices (N) × 4.3125 kHz | | |
|---|---|---|---|---|---|---|
| A43 | 9 | 17 | 25 | 40 | 56 | 64 |
| B43 | 37 | 45 | 53 | 72 | 88 | 96 |
| C43 |  | 7 | 9 | 12 | 14 | 64 |
| P43 |  | — |  | 115 | 138 | 165 |
|  |  |  |  | 198 | 238 | 255 |

TABLE 34

ADSL Band 4 kHz Carrier Indices

| Carrier set designation | HSTU-R Upstream carrier sets Frequency indices (N) × 4 kHz | HSTU-C Downstream carrier sets Frequency indices (N) × 4 kHz |
|---|---|---|
| A4 | 3 | 5 |
| P4 | 10, 12, 14, 17, 20, 24, 29, 34, 41, 50, 59, 71, 86, 103, 123, 148, 177, 213, 255 | 10, 12, 14, 17, 20, 24, 29, 34, 41, 50, 59, 71, 86, 103, 123, 148, 177, 213, 255 |

TABLE 35

VDSL Band 128 kHz Carrier Indices

| Carrier set designation | HSTU-R Upstream carrier sets Frequency indices (N) × 128.0 kHz | HSTU-C Downstream carrier sets Frequency indices (N) × 128.0 kHz |
|---|---|---|
| V128 | 10, 12, 14, 17, 20, 24, 29, 34, 41, 50, 59, 71, 86, 103, 123, 148, 177, 213, 255 | 10, 12, 14, 17, 20, 24, 29, 34, 41, 50, 59, 71, 86, 103, 123, 148, 177, 213, 255 |

TABLE 36

VDSL Band 138 kHz Carrier Indices

| Carrier set designation | HSTU-R Upstream carrier sets Frequency indices (N) × 138.0 kHz | HSTU-C Downstream carrier sets Frequency indices (N) × 138.0 kHz |
|---|---|---|
| V138 | 8, 10, 12, 14, 17, 20, 24, 29, 34, 41, 50, 59, 71, 86, 103, 123, 148, 177, 213 | 8, 10, 12, 14, 17, 20, 24, 29, 34, 41, 50, 59, 71, 86, 103, 123, 148, 177, 213 |

The contents of the MS messages are illustrated using an example xDSL referred to as GDSL, but the invention can be applied to any xDSL. Octet coding of the MS messages are shown in Tables 37 through 42, below. The procedure with example contents is shown in Table 43, below.

TABLE 37

Standard Information Field - SPar(1) Coding

| SPar(1)s | 8 | 7 | 6 | 5 | 4 | 3 | 2 | 1 |
|---|---|---|---|---|---|---|---|---|
| G.992.1 - Annex A | x | x | x | x | x | x | x | 1 |
| G.992.1 - Annex B | x | x | x | x | x | x | 1 | x |
| G.992.1 - Annex C | x | x | x | x | x | 1 | x | x |
| G.992.2 - Annex A/B | x | x | x | x | 1 | x | x | x |

TABLE 37-continued

Standard Information Field - SPar(1) Coding

| SPar(1)s | 8 | 7 | 6 | 5 | 4 | 3 | 2 | 1 |
|---|---|---|---|---|---|---|---|---|
| G.992.2 - Annex C | x | x | x | 1 | x | x | x | x |
| GDSL | x | x | 1 | x | x | x | x | x |
| Reserved | x | 1 | x | x | x | x | x | x |
| No parameters in this octet | x | 0 | 0 | 0 | 0 | 0 | 0 | 0 |

TABLE 38

GDSL SPar(2) Coding

| GDSL NPar(2)s | 8 | 7 | 6 | 5 | 4 | 3 | 2 | 1 |
|---|---|---|---|---|---|---|---|---|
| GDSL PMMS initiate (measure using set #) | x | x | x | x | x | x | x | 1 |
| GDSL Upstream PBO | x | x | x | x | x | x | 1 | x |
| GDSL Downstream PBO | x | x | x | x | x | 1 | x | x |
| GDSL Initiate training | x | x | x | x | 1 | x | x | x |
| Reserved | x | x | x | 1 | x | x | x | x |
| Reserved | x | x | 1 | x | x | x | x | x |
| No parameters in this octet | x | x | 0 | 0 | 0 | 0 | 0 | 0 |

TABLE 39

GDSL PMMS Initiate - NPar(3) Coding

| GDSL PMMS initiate - NPar(3) | 8 | 7 | 6 | 5 | 4 | 3 | 2 | 1 |
|---|---|---|---|---|---|---|---|---|
| GDSL PMMS set #1 (all carriers) | x | x | x | x | x | x | x | 1 |
| GDSL PMMS set #2 (all V128 carriers) | x | x | x | x | x | x | 1 | x |
| GDSL PMMS set #3 (all V138 carriers) | x | x | x | x | x | 1 | x | x |
| GDSL PMMS set #4 (all A4 and P4 carriers) | x | x | x | x | 1 | x | x | x |
| GDSL PMMS set #5 (all P4 carriers) | x | x | x | 1 | x | x | x | x |
| Reserved | x | x | 1 | x | x | x | x | x |
| No parameters in this octet | x | x | 0 | 0 | 0 | 0 | 0 | 0 |

TABLE 40

GDSL Upstream PBO - NPar(3) Coding

| GDSL Upstream PBO - NPar(3) coding | 8 | 7 | 6 | 5 | 4 | 3 | 2 | 1 |
|---|---|---|---|---|---|---|---|---|
| Upstream PBO (dB) (bits 6–1 × 1 dB) | x | x | x | x | x | x | x | x |
| Reserved | x | x | 1 | 1 | 1 | 1 | 1 | 1 |

TABLE 41

GDSL Downstream PBO - NPar(3) Coding

| GDSL Upstream PBO - NPar(3) coding | 8 | 7 | 6 | 5 | 4 | 3 | 2 | 1 |
|---|---|---|---|---|---|---|---|---|
| Downstream PBO (dB) (bits 6–1 × 1 dB) | x | x | x | x | x | x | x | x |
| Reserved | x | x | 1 | 1 | 1 | 1 | 1 | 1 |

TABLE 42

GDSL Training Parameters - NPar(3) Coding

| GDSL training parameters - NPar(3) | 8 | 7 | 6 | 5 | 4 | 3 | 2 | 1 |
|---|---|---|---|---|---|---|---|---|
| GDSL parameter #1 | x | x | x | x | x | x | x | 1 |
| GDSL parameter #2 | x | x | x | x | x | x | 1 | x |
| GDSL parameter #3 | x | x | x | x | x | 1 | x | x |
| GDSL parameter #4 | x | x | x | x | 1 | x | x | x |
| GDSL parameter #5 | x | x | x | 1 | x | x | x | x |
| Reserved | x | x | 1 | x | x | x | x | x |
| No parameters in this octet | x | x | 0 | 0 | 0 | 0 | 0 | 0 |

TABLE 43

PMMS (Standard Measurements Procedure)

| Transmit Unit | Name | # | Contents of octets |
|---|---|---|---|
| HSTU-R | MS | 1 | Table 37 x010 0000 (Select GVDSL)<br>Table 38 xx00 0001 (start PMMS measurements)<br>Table 39 xx00 0001 (all carriers)<br>Table 40 N/A<br>Table 41 N/A<br>Table 42 N/A |
| HSTU-C | ACK | 2 | The message Acknowledges selection of PMMS |
| HSTU-R | $PM_{RH}$ | 3 | |
| HSTU-C | $PM_{CH}$ | 4 | |
| HSTU-R | MR | 5 | Request MS |
| HSTU-C | MS | 6 | Table 37 x010 0000 (Select GVDSL)<br>Table 38 xx00 0010 (upstream PBO)<br>Table 39 N/A<br>Table 40 xx00 0110 (6 dB)<br>Table 41 N/A<br>Table 42 N/A |
| HSTU-R | ACK | 7 | The message Acknowledges the upstream PBO request value |
| HSTU-C | MS | 8 | Table 37 x010 0000 (Select GVDSL)<br>Table 38 xx00 1100 (downstream PBO & initiate training)<br>Table 39 N/A<br>Table 40 xx00 0110 (6 dB) (repeat)<br>Table 41 xx00 0111 (7 dB)<br>Table 42 xxxx xxxx |
| HSTU-C | ACK | 9 | The message Acknowledges selection of the GDSL using the specified downstream PBO |
| — | Training | — | GDSL training begins. |

B. Fixed Measurement Signals with Explicit Parameters

The following description of the PMMS is provided with explicitly requested parameters for the measurement signals.

Figure 6:
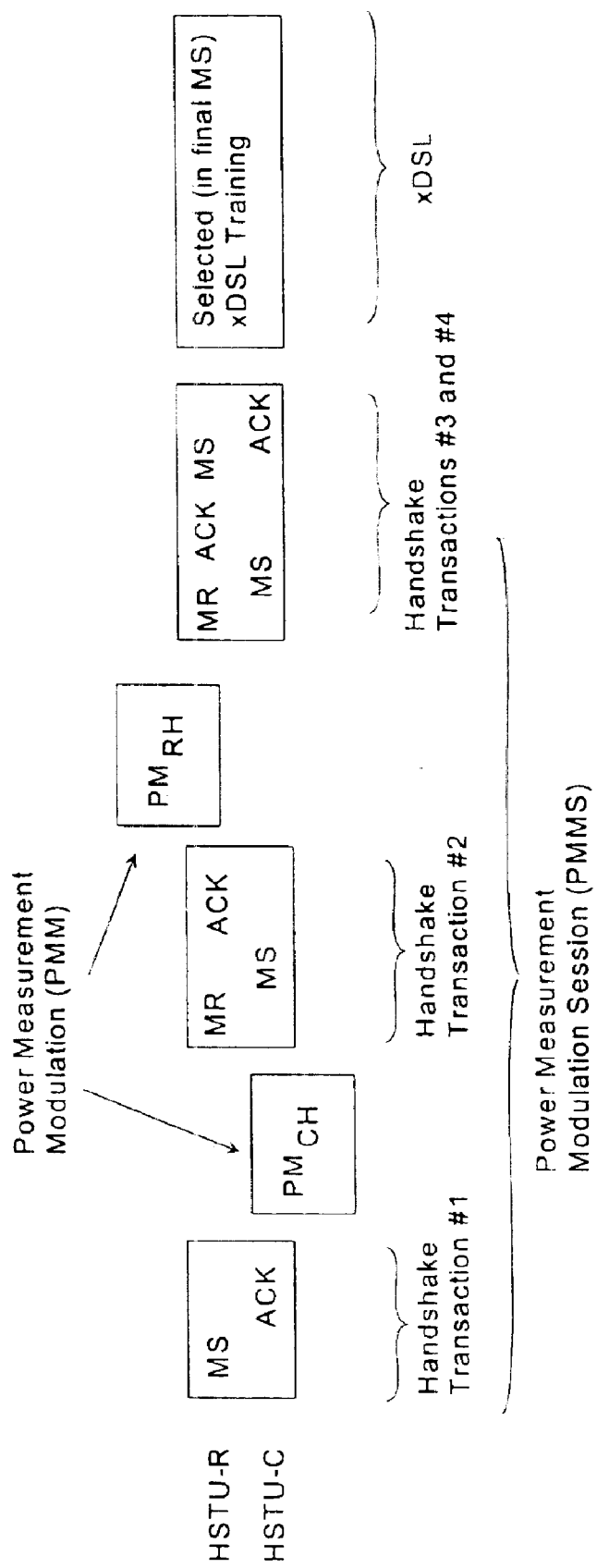
FIG. 6 illustrates the PMMS session using existing messages and transactions with explicitly requested parameters for the measurement signals.

The transactions and signal exchange is listed in Table 44, below, and illustrated in FIG. 6. For purposes of discussion, it is assumed that the first message is always sent by the HSTU-R, The contents of the MS messages are explained using an example xDSL modem referred to as GDSL, but the invention can be applied to any xDSL without departing from the spirit and/or scope of the invention. The octet coding of the MS messages is shown in Tables 44 through 49. A second procedure with example contents is shown in Table 50.

Power levels are expressed in 3 bits, as shown in Table 45. The power level for each carrier in the ADSL 4.3125 kHz band is coded in Table 46. The power level for each carrier in the ADSL 4.0 kHz band is coded in Table 47. The power level for each carrier in the VDSL band is coded in Table 48.

TABLE 44

PMMS (Explicit Parameters)

| Transmit Unit | Message/ Signal Name | # | Description |
|---|---|---|---|
| HSTU-R | MS | 1 | The message:<br>is a request for the HSTU-C to send the power measurement modulation session (PMMS) signals $PM_{CH}$; and<br>includes the explicit details on the parameters of the desired signal ($PM_{CH}$) to be transmitted |
| HSTU-C | ACK | 1 | The message Acknowledges selection of PMMS |
| HSTU-C | $PM_{CH}$ | — | This signal allows the HSTU-R to measure the line conditions and power loss |
| HSTU-R | MR | 2 | The message:<br>the HSTU-R is done receiving $PM_{CH}$, and is a request to the HSTU-C to send an MS |

TABLE 44-continued

PMMS (Explicit Parameters)

| Transmit Unit | Message/Signal Name | # | Description |
|---|---|---|---|
| HSTU-C | MS | 2 | The message:<br>is a request for the HSTU-R to send the power measurement modulation session (PMMS) signals $PM_{RH}$; and<br>includes the explicit details on the parameters of the desired signal ($PM_{RH}$) to be transmitted |
| HSTU-R | ACK | 2 | The message Acknowledges selection of PMMS |
| HSTU-R | $PM_{RH}$ | — | This signal allows the HSTU-C to measure the line conditions and power loss |
| HSTU-R | MR | 3 | The message:<br>is a request for the HSTU-C to send an MS |
| HSTU-C | MS | 3 | The message:<br>conveys the upstream PBO request |
| HSTU-R | ACK | 3 | The message Acknowledges the upstream PBO request value |
| HSTU-C | MS | 4 | The message:<br>is a request for a specific xDSL modulation mode, and contains a parameter request for a certain amount of PBO in the downstream direction |
| HSTU-C | ACK | 4 | The message Acknowledges selection of the xDSL using the specified downstream PBO |
| — | Training | — | Training begins |

TABLE 45

Power Level Encoding Bits

| Code | Description |
|---|---|
| 000 | not transmitted |
| 001 | −60 dBm (per carrier) |
| 010 | −50 dBm (per carrier) |
| 011 | −40 dBm (per carrier) |
| 100 | −30 dBm (per carrier) |
| 101 | −20 dBm (per carrier) |
| 110 | −10 dBm (per carrier) |
| 111 | Nominal |

TABLE 46

ADSL Band 4.3125 kHz Carrier Transmit Power {NPar(2)} Coding

| Power | | 8 | 7 | 6 | 5 | 4 | 3 | 2 | 1 |
|---|---|---|---|---|---|---|---|---|---|
| Octet #1 | #009 #012 | x | x | x | x | x | x | x | x |
| Octet #2 | #014 #017 | x | x | x | x | x | x | x | x |
| Octet #3 | #025 #037 | x | x | x | x | x | x | x | x |
| Octet #4 | #040 #045 | x | x | x | x | x | x | x | x |
| Octet #5 | #053 #056 | x | x | x | x | x | x | x | x |
| Octet #6 | #064 #072 | x | x | x | x | x | x | x | x |
| Octet #7 | #088 #096 | x | x | x | x | x | x | x | x |
| Octet #8 | #115 #138 | x | x | x | x | x | x | x | x |
| Octet #9 | #165 #198 | x | x | x | x | x | x | x | x |
| Octet #10 | #238 #255 | x | x | x | x | x | 1 | 1 | 1 |

TABLE 47

ADSL Band 4.0 kHz Carrier Transmit Power {NPar(2)} Coding

| Power | | 8 | 7 | 6 | 5 | 4 | 3 | 2 | 1 |
|---|---|---|---|---|---|---|---|---|---|
| Octet #1 | #003 #005 | x | x | x | x | x | x | x | x |
| Octet #2 | #008 #010 | x | x | x | x | x | x | x | x |
| Octet #3 | #012 #014 | x | x | x | x | x | x | x | x |
| Octet #4 | #017 #020 | x | x | x | x | x | x | x | x |
| Octet #5 | #024 #029 | x | x | x | x | x | x | x | x |

TABLE 47-continued

ADSL Band 4.0 kHz Carrier Transmit Power {NPar(2)} Coding

| Power | | 8 | 7 | 6 | 5 | 4 | 3 | 2 | 1 |
|---|---|---|---|---|---|---|---|---|---|
| Octet #6 | #034 #041 | x | x | x | x | x | x | x | x |
| Octet #7 | #050 #059 | x | x | x | x | x | x | x | x |
| Octet #8 | #071 #086 | x | x | x | x | x | x | x | x |
| Octet #9 | #103 #123 | x | x | x | x | x | x | x | x |
| Octet #10 | #148 #177 | x | x | x | x | x | x | x | x |
| Octet #11 | #213 #255 | x | x | x | x | x | 1 | 1 | 1 |

TABLE 48

VDSL Band Carrier Transmit Power {NPar(2)} Coding

| Power | | 8 | 7 | 6 | 5 | 4 | 3 | 2 | 1 |
|---|---|---|---|---|---|---|---|---|---|
| Octet #1 | #008 #010 | x | x | x | x | x | x | x | x |
| Octet #2 | #012 #014 | x | x | x | x | x | x | x | x |
| Octet #3 | #017 #020 | x | x | x | x | x | x | x | x |
| Octet #4 | #024 #029 | x | x | x | x | x | x | x | x |
| Octet #5 | #034 #041 | x | x | x | x | x | x | x | x |
| Octet #6 | #050 #059 | x | x | x | x | x | x | x | x |
| Octet #7 | #071 #086 | x | x | x | x | x | x | x | x |
| Octet #8 | #103 #123 | x | x | x | x | x | x | x | x |
| Octet #9 | #148 #177 | x | x | x | x | x | x | x | x |
| Octet #10 | #213 #255 | x | x | x | x | x | 1 | 1 | 1 |

TABLE 49

$PM_X$ Signal Duration - NPar(2) Coding

| $PM_X$ signal duration - NPar(2) coding | 8 | 7 | 6 | 5 | 4 | 3 | 2 | 1 |
|---|---|---|---|---|---|---|---|---|
| $PM_X$ signal duration (bits 6–1 × 20 msec) | x | x | x | x | x | x | x | x |
| Reserved | x | x | 1 | 1 | 1 | 1 | 1 | 1 |

TABLE 50

Second Example Of PMMS - Explicit Measurements Procedure

| Transmit Unit | Name | # | Contents of octets |
|---|---|---|---|
| HSTU-R | MS | 1 | Table 37 x010 0000 (Select GVDSL) |
| | | | Table 38 xx00 0001 (start PMMS measurements with $PM_{CH}$) |
| | | | Table 46 xx00 1001 (favorite carriers) |
| | | | Table 47 xx00 1001 (favorite carriers) |
| | | | Table 48 xx00 1001 (favorite carriers) |
| | | | Table 40 N/A |
| | | | Table 41 N/A |
| | | | Table 42 N/A |
| HSTU-C | ACK | 1 | This message Acknowledges selection of PMMS |
| HSTU-C | $PM_{CH}$ | — | This signal allows the HSTU-R to measure the line conditions and power loss |
| HSTU-R | MR | 2 | This message indicates the HSTU-R is done receiving $PM_{CH}$ and is a request the HSTU-C to send an MS |
| HSTU-C | MS | 2 | Table 37 x010 0000 (Select GVDSL) |
| | | | Table 38 xx00 0001 (start PMMS measurements with $PM_{RH}$) |
| | | | Table 46 xx00 1001 (favorite carriers) |
| | | | Table 47 xx00 1001 (favorite carriers) |
| | | | Table 48 xx00 1001 (favorite carriers) |
| | | | Table 40 N/A |
| | | | Table 41 N/A |
| | | | Table 42 N/A |
| HSTU-C | ACK | 2 | This message Acknowledges selection of PMMS |
| HSTU-R | $PM_{RH}$ | — | This signal allows the HSTU-C to measure the line conditions and power loss |
| HSTU-R | MR | 3 | Request MS |
| HSTU-C | MS | 3 | Table 37 x010 0000 (Select GVDSL) |
| | | | Table 38 xx00 0010 (upstream PBO) |
| | | | Table 39 N/A |
| | | | Table 40 xx00 0110 (6 dB) |
| | | | Table 41 N/A |
| | | | Table 42 N/A |
| HSTU-R | ACK | 3 | The message Acknowledges the upstream PBO request value |
| HSTU-C | MS | 4 | Table 37 x010 0000 (Select GVDSL) |
| | | | Table 38 xx00 1100 (downstream PBO & initiate training) |
| | | | Table 39 N/A |
| | | | Table 40 xx00 0110 (6 dB) (repeat) |
| | | | Table 41 xx00 0111 (7 dB) |
| | | | Table 42 xxxx xxxx |
| HSTU-R | ACK | 4 | This message Acknowledges the downstream PBO request value |
| — | Training | — | GDSL training begins |

C. Stepped Measurement Signals With Standard Parameters

This scheme is similar to the Fixed Measurement Signals With Standard Parameters, described above, except that the $PM_X$ signal is stepped from low power to high power. The transmission power is continuously stepped (increased) until the opposite HSTU-X can receive sufficient power and sends an "Acknowledgment". In the disclosed invention, the stepping occurs in 2 dB increments, starting from approximately −90 dBm/Hz every 200 ms; however, other stepping rates and timing values may be used without deviating from the spirit and/or scope of the invention.

Figure 7:
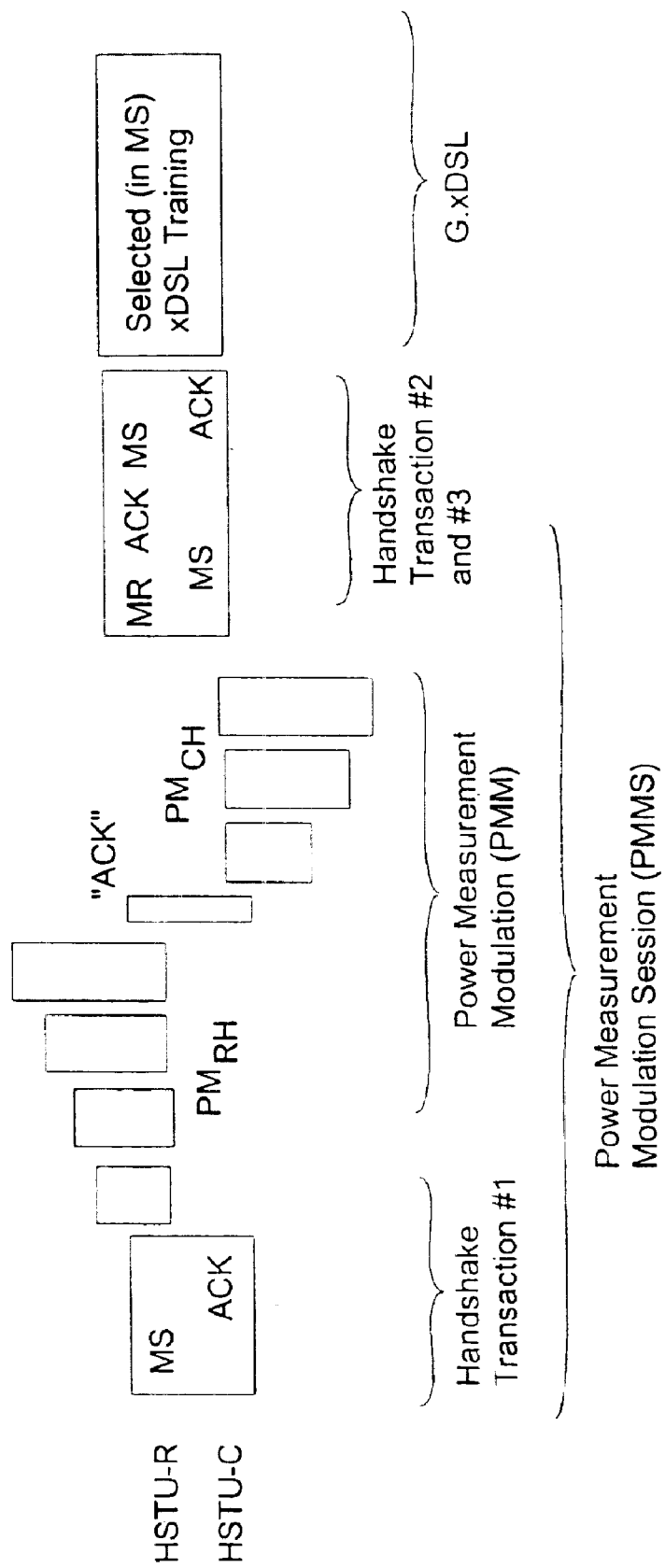
FIG. 7 illustrates the PMMS session using existing messages and transactions in which the measurement signal is stepped from a low power to a high power with a predetermined set of parameters for the measurement signal.

The sequence of the transaction and signals is very similar to Table 32, above. An "ACKI" signal uses the same carriers as the handshake transaction and is inserted between the measurement signals as shown in Table 51, below, and illustrated in FIG. 7.

TABLE 51

PMMS (Stepped Standard Measurements)

| Transmit Unit | Message/ Signal Name | Description |
|---|---|---|
| HSTU-R | MS | This message is a request for the HSTU-C and HSTU-R to send the power measurement modulation session (PMMS) signals ($PM_{CH}$ and $PM_{RH}$), and includes the category choice which represents the parameters of the desired signal ($PM_{CH}$ and $PM_{RH}$) to be transmitted. |
| HSTU-C | ACK | This message Acknowledges selection of PMMS |
| HSTU-R | $PM_{RH}$ | This signal allows the HSTU-C to measure the line conditions and power loss |
| HSTU-C | ACK | This message acknowledge reception of $PM_{RH}$ and beginning of transmission of $PM_{CH}$ |
| HSTU-C | $PM_{CH}$ | This signal allows the HSTU-R to measure the line conditions and power loss |

TABLE 51-continued

PMMS (Stepped Standard Measurements)

| Transmit Unit | Message/ Signal Name | Description |
| --- | --- | --- |
| HSTU-R | MR | This message is a request to the HSTU-C to send an MS. |
| HSTU-C | MS | This message conveys the upstream PBO request |
| HSTU-R | ACK | This message Acknowledges the upstream PBO request value |
| HSTU-C | MS | This message is a request for a specific xDSL modulation mode, and contains a parameter request for a certain amount of PBO in the downstream direction |
| HSTU-C | ACK | This message Acknowledges selection of the xDSL using the specified downstream PBO |
| — | Training | Training begins |

D. Stepped Measurement Signals with Explicit Parameters

This scheme is similar to the Fixed Measurement Signals With Explicit Parameters, described above, except that the $PM_X$ signal is stepped (incrementally increased) from a low power to a high power. The power stepping continues until the opposite HSTU-X can receive sufficient power and sends an "Acknowledgment". In the disclosed invention, the stepping occurs in approximate 2 dB increments, starting from approximately −90 dBm/Hz every 200 ms; however, other stepping rates and timing values may be used without deviating from the spirit and/or scope of the invention.

Figure 8:
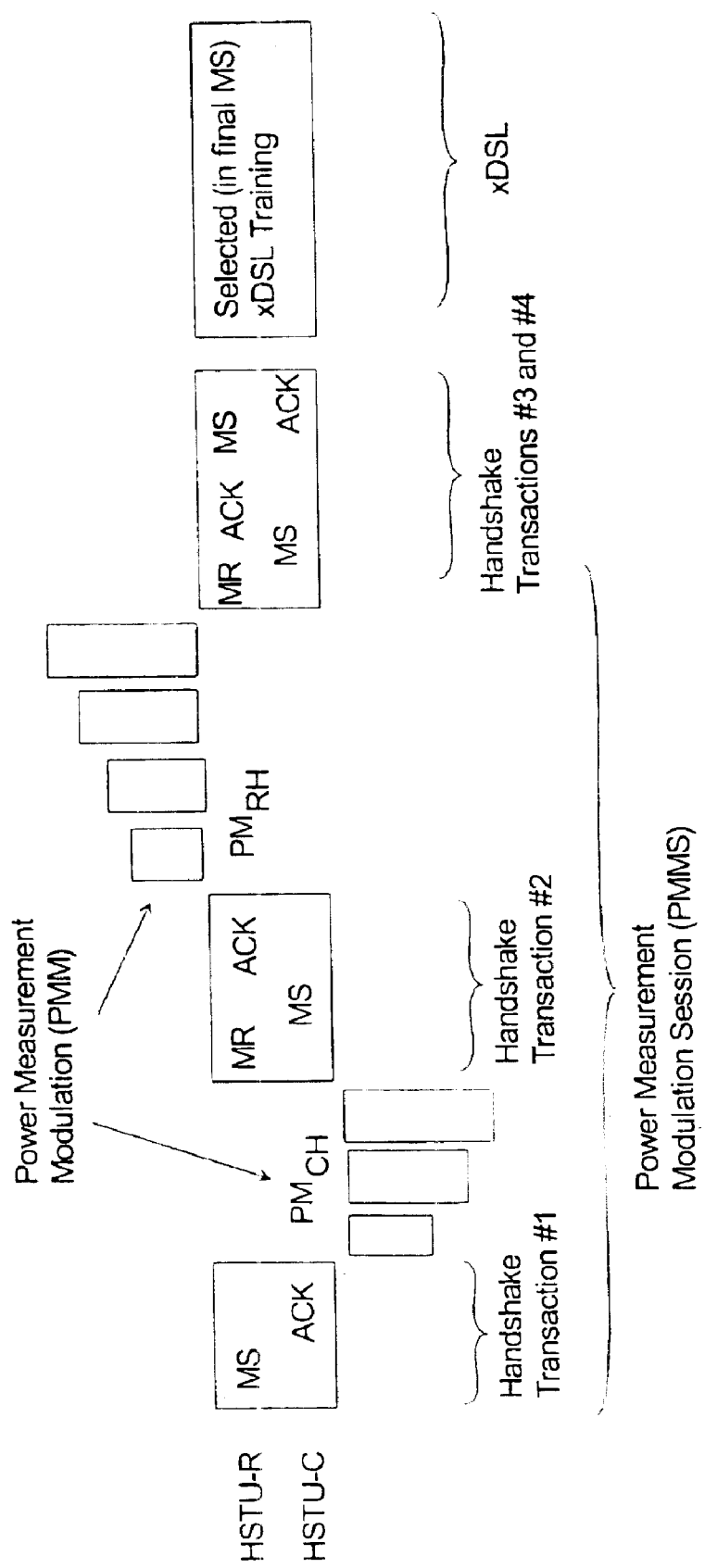
FIG. 8 illustrates the PMMS session using existing messages and transactions in which the measurement signal is stepped from a low power to a high power, using explicitly requested parameters for the measurement signals.

The transaction sequence and signals are illustrated in FIG. 8. The transaction sequence and signals are the same as shown in Table 44, above, except that the $PM_X$ signal power varies over time.

Fourth Embodiment

Another "power measurement modulation" sequence that is similar to existing messages (e.g., derived from two existing messages) and transactions will now be described. This sequence of signals and transaction, which is referred to as a power measurement modulation session (PMMS), is comprised of two types of elements: (1) digital negotiation and control channels; and (2) power measurement signals. Parameters that describe power measurement signals are negotiated and indicated as messages in the negotiation and control channels of the PMMS. After the power measurement signals are received and analyzed, the preferred transmit levels are indicated in messages to the opposite side.

It is noted that the procedures described herein are equally applicable to digital negotiation elements using either half duplex or full duplex procedures.

The PMMS initially transmits (sends) power measurement signals at the lowest possible level. In this regard, it is noted that the PMM signals may optionally re-transmit the power measurement signals at incrementally higher power levels if the signals were not adequately received. Loop attenuation and minimum necessary transmit power is calculated by subtracting the measured receive power of the signals from the transmit power indicated in the messages of the PMMS. It is also understood that the power measurement signals may be initiated at any desired predetermined level without departing from the spirit and/or scope of the invention.

Further, the functionality and methodology of using the PMMS can be applied to any handshake procedure, such as, but not limited to, ITU-T Recommendations V.8 and V.8bis.

According to the disclosed invention, a new message, referred to as MR-P, is derived from the message MR that has parameters similar to message MS. Message MR-P is similar to message PRR, described above. MS also behaves the same as the PCR message, described above. Message MR-P (PRR) follows the same rules as message MR; however, message MR-P can include parameters. The MR-P (PRR) parameters can be used to suggest values for parameters in the returning MS (PCR) message.

In order to provide compatibility with prior art devices, the MR-P message is assigned a revision number of at least 2. A device that supports MR-P can leave all of the other message types at revision level 1. It is noted that Section 9.3.2 of ITU Recommendation G.994.1 provides a procedure for message types having revision numbers greater than 1 (e.g., new message types).

The following discussion is provided making reference to the previously discussed data initiation communication procedures described in ITU-T Recommendation G.994.1. However, it is understood that other procedures can be used with the present invention without departing from the spirit and/or scope thereof.

Figure 9:
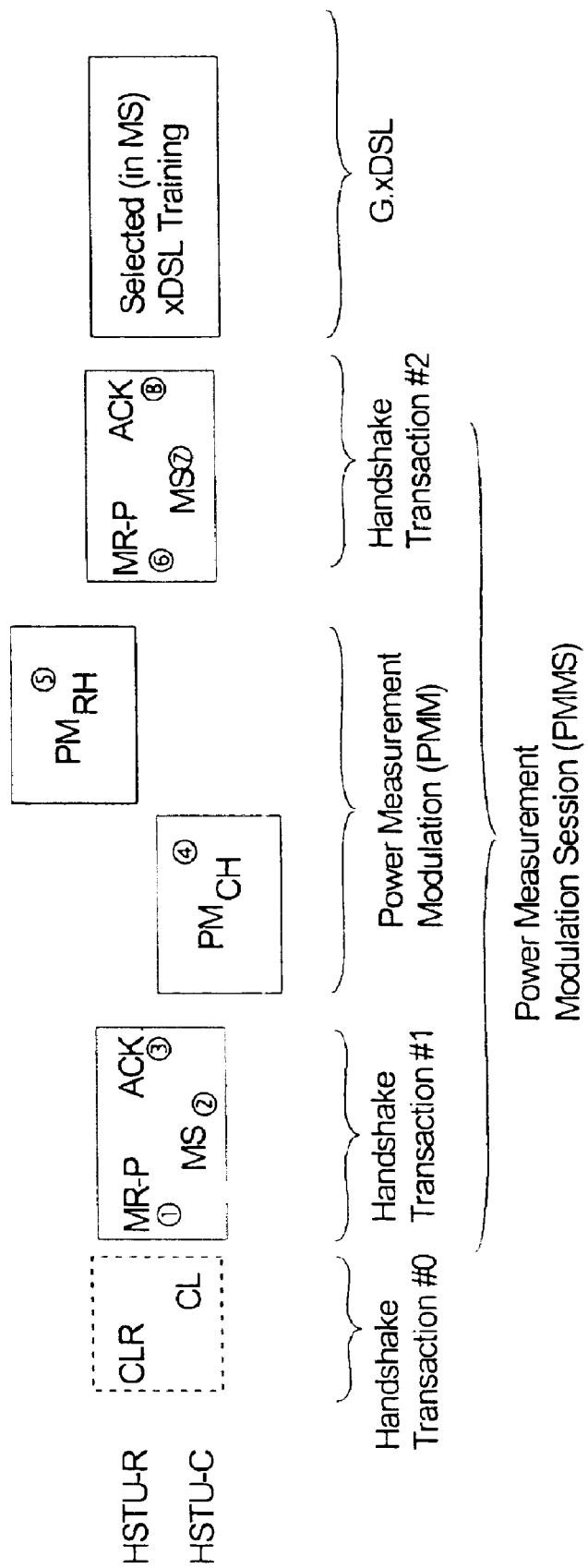
FIG. 9 illustrates the PMMS session using a message MR-P that is derived from existing messages and transactions for Power Back Off (PBO)

The MR-P message is used to initiate a Transaction B (described in Section 10.1.2 of ITU-T Recommendation G.994.1), in order to negotiate and select the parameters for a Power Back Off (PBO) mode of a xDSL modulation. At the termination of Transaction B, the HSTU-X performs a cleardown (described in Section 11.3 of ITU-T Recommendation G.994.1) and initiates the Power Measurement Modulation (PMM) of the current invention, in which signals are transmitted from the HSTU-X to measure for Power Back Off (PBO). After the PMM, the HSTU-R restarts the ITU-T Recommendation G.944.1 procedures and again initiates a Transaction B with the MR-P message. In this transaction, the parameters for the PBO are exchanged, and the final xDSL mode of operation is selected. Following the ITU-T Recommendation G.994.1 cleardown, the selected xDSL begins training. The entire sequence is illustrated in FIG. 9.

In the MR-P message, the HSTU-R requests a PMMS mode by setting a NPar(2) bit. The parameters (or parameter sets) are requested through SPar(2) and NPar(3) octets. Similarly, the HSTU-C responds with similar parameters set in the octets. After the HSTU-R sends the ACK message, the ITU-T Recommendation G.994.1 session performs the cleardown operation, and then, the PMM signals are sent. The procedure assumes that after the PMMS measurements, the xTU-X returns control to ITU-T Recommendation G.994.1.

During the PMM, the xTU-C sends the first signals, and then, the xTU-R responds by sending signals. This allows the xTU-C to acknowledge the ITU-T Recommendation G.994.1 ACK message sent from the HSTU-R The characteristics and timing of the PMM signals are predetermined in the ITU-T Recommendation G.994.1 transaction B exchange.

After each side has performed their measurements and analysis, they inform the opposite side of their specific value request of the PBO and possible parameters, such as, for example, data rates. This is a request with parameters, so it requires the HSTU-R to use MR-P and the HSTU-C to use MS in the B transaction.

An overview of the contents of each message is given in Table 52, below. Note that "#" corresponds to the step number in FIG. 9.

If the HSTU-C receives a MR-only message, the HSTU-C may:

(a) Respond with REQ-MR-P (that is, create another new message type that is similar to REQ-MR; the HSTU-C can request to send MR, but it also has parameters like MR-P). However, the HSTU-C would not know that a PMM is being requested, unless the REQ-MR-P also contained parameters, since requesting MR-P is not necessarily limited to PMM;

TABLE 52

PMMS (Standard Measurements)

| Transmit Unit | Message/ Signal Name | # | Description |
| --- | --- | --- | --- |
| HSTU-R (optional) | CLR | 0a | This message includes information on the capabilities of the types of PMM signals that the HSTU-R can transmit |
| HSTU-C (optional) | CL | 0b | This message includes information on the capabilities of types of PMM signals that the HSTU-C can transmit |
| HSTU-R | MR-P (PRR) | 1 | This message is a request for the PMM mode, and includes the parameters (or category choice which represents a set of predefined parameters) of the desired signal to be transmitted by the HSTU-C |
| HSTU-C | MS (PCR) | 2 | This message: is a selection for the PMM mode, and includes the parameters (or category choice which represents a set of predefined parameters) of the desired signal to be transmitted by the HSTU-R; echoes the parameters (or category choice which represents a set of predefined parameters) of the desired signal to be transmitted by the HSTU-C |
| HSTU-R | ACK | 3 | This message Acknowledges selection of PMM |
| HSTU-C | $PM_{CH}$ | 4 | This signal allows the HSTU-R to measure the line conditions and power loss |
| HSTU-R | $PM_{RH}$ | 5 | This signal allows the HSTU-C to measure the line conditions and power loss. |
| HSTU-R | MR-P (PRHA) | 6 | This message: acknowledges reception of $PM_{CH}$; is a request for a specific xDSL modulation mode (with possible data rate preferences); and contains a parameter request a certain amount of PBO in the downstream direction |
| HSTU-C | MS (PCHA) | 7 | This message: acknowledges reception of $PM_{RH}$; is a selection for a specific xDSL modulation mode (with possible data rate preferences); contains a parameter selection a certain amount of PBO in the downstream direction; and contains a parameter selection a certain amount of PBO in the upstream direction |
| HSTU-R | ACK | 8 | This message Acknowledges the upstream PBO request value and selected mode of operation |
| — | Training | — | Training begins |

In "revision 1" of ITU-T Recommendation G.994.1, a HSTU-X generating it's MS message contents does not need to consider an input from the opposite HSTU-X. In order to preserve backward compatibility with revision 1 of ITU-T Recommendation G.994.1, the current invention sets forth an explicit rule. This rule states that the contents of an MS message can "override" the parameters and mode suggested in MR-P, but it should do so cautiously, so as to avoid a NAK from the HSTU-R.

Before suggesting the power level of the PMM signals, the HSTU-X should make a rough estimate of the line length/attenuation by examining the received power levels of the ITU-T Recommendation G.994.1 carriers. In general, for reasons of spectral politeness, power levels should be selected so as to err on the side of using less power.

Some scenarios are presented below with possible solutions and a recommendations.

1. How does a HSTU-C indicate it wants to do a PMM session? Specifically, what should a HSTU-C do when the HSTU-R initiates the transaction with a plain MR or MS?

(b) Respond with REQ-MS. However, the HSTU-R would not know that the HSTU-C wants PME; or (c) Respond with MS with PMM mode selected. This notifies the HSTU-R that the PMM will begin unless NAKed. If the HSTU-R decides that it does want to suggest the PMM parameters, it can then send a NAK-NR (Not ready) to conclude the transaction and-immediately initiate a new transaction by sending MR-P with its suggestions.

According to the present invention, the preferred (but not only) solution is to respond with PMM mode in MS.

If the HSTU-C receives a MS message, the HSTU-C may:

(a) Respond with REQ-MR-P. However, this solution exhibits the same problems as noted above;

(b) Respond with NAK-NR. However, the HSTU-R may not necessarily send MR-P; or (c) Respond with REQ-MR. The HSTU-R will respond with MR, and then HSTU-C will respond with MS with PMM mode selected.

According to the current invention, the preferred (but not sole) solution is to respond with REQ-MR, and then proceed as described above.

2. If PBO measurements are not successful, how can another PMM session be initiated?

Possible solutions include:

(a) If the HSTU-R was unable to determine an appropriate PBO level from the received $PM_{CH}$, it can re-suggest the PMM-mode in the MR-P message sent after the PMM (where the PBO downstream value normally would have been transmitted); or (b) If the HSTU-C was unable to determine an appropriate PBO level from the received $PM_{RH}$, it can re-suggest the PMM-mode in the MS message sent after the PMM (where the PBO value normally would have been transmitted).

Power Back Off measurement methods will now be disclosed using enumerated sets of standard parameters or explicit parameters.

A. Standard Set of Parameter Measurements

This means of operation assumes that a standard set of parameters for both upstream and downstream measurement signal characteristics is being requested. This can substantially shorten the length of the messages. The HSTU-R selects PMMS using a "parameter set" mode by setting a specific NPar(2) bit. The parameter set is requested through a SPar(2) octet and a NPar(3) octet.

The contents of the MS messages will be illustrated below using G.shdsl as an example; however, it is understood that the MS messages can be used for any of the various xDSL systems. In this regard, reference is made to ITU-Telecommunication Standardization Sector document entitled "G.shdsl Draft: Recommendation for G.shdsl" by Steve BLACKWELL, published in August, 1999 and assigned Temporary Document NG-R15X, the subject matter of which is expressly incorporated herein by reference in its entirety.

For a first (pre-PMM handshake transaction, the octet coding of the MR-P/MS messages is shown in Tables 53 through 55. For the second (post-PMM) handshake transaction, the octet coding of the MR-P/MS messages is shown in Tables 56 through 59. A procedure with example contents is shown in Table 60, and is illustrated in FIG. 9.

TABLE 53

Standard Information Field (SPar(1) Coding)

| SPar(1)s | 8 | 7 | 6 | 5 | 4 | 3 | 2 | 1 |
|---|---|---|---|---|---|---|---|---|
| G.992.1 - Annex A | x | x | x | x | x | x | x | 1 |
| G.992.1 - Annex B | x | x | x | x | x | x | 1 | x |
| G.992.1 - Annex C | x | x | x | x | x | 1 | x | x |
| G.992.2 - Annex A/B | x | x | x | x | 1 | x | x | x |
| G.992.2 - Annex C | x | x | x | 1 | x | x | x | x |
| G.SHDSL | x | x | 1 | x | x | x | x | x |
| Reserved | x | 1 | x | x | x | x | x | x |
| No parameters in this octet | x | 0 | 0 | 0 | 0 | 0 | 0 | 0 |

TABLE 54

G.SHDSL Mode (NPar(2) Coding)

| G.SHDSL NPar(2)s | 8 | 7 | 6 | 5 | 4 | 3 | 2 | 1 |
|---|---|---|---|---|---|---|---|---|
| G.SHDSL Initiate training | x | x | 0 | 0 | 0 | 0 | 0 | 1 |
| G.SHDSL PMMS (measure using parameters referenced in Table 55) | x | x | 0 | 0 | 0 | 0 | 1 | 0 |
| Reserved | x | x | 0 | 0 | 0 | 1 | 0 | 0 |

TABLE 54-continued

G.SHDSL Mode (NPar(2) Coding)

| G.SHDSL NPar(2)s | 8 | 7 | 6 | 5 | 4 | 3 | 2 | 1 |
|---|---|---|---|---|---|---|---|---|
| Reserved | x | x | 0 | 0 | 1 | x | 0 | 0 |
| Reserved | x | x | 0 | 1 | 0 | 0 | 0 | 0 |
| Reserved | x | x | 1 | 0 | 0 | 0 | 0 | 0 |
| No parameters in this octet | x | x | 0 | 0 | 0 | 0 | 0 | 0 |

Note only one (1) value (ie, Mode) can be selected.

TABLE 55

G.SHDSL Parameters (SPar(2) Coding)

| G.SHDSL SPar(2)s | 8 | 7 | 6 | 5 | 4 | 3 | 2 | 1 |
|---|---|---|---|---|---|---|---|---|
| G.SHDSL Initiate training (using downstream parameter values from Tables 56 through 58 | x | x | x | x | x | x | x | 1 |
| G.SHDSL Initiate training (using upstream parameter values from Tables 56 through 58 | x | x | x | x | x | x | 1 | x |
| G.SHDSL downstream PMMS using set # from Table 59 | x | x | x | x | x | 1 | x | x |
| G.SHDSL upstream PMMS using set # from Table 59 | x | x | x | x | 1 | x | x | x |
| G.SHDSL downstream PMMS using explicit parameters in Table 61 and multiple copies of Tables 62, 64, 65 and 66 | x | x | x | 1 | x | x | x | x |
| G.SHDSL upstream PMMS using explicit parameters in Table 61 and multiple copies of Tables 62, 64, 65, and 66. | x | x | 1 | x | x | x | x | x |
| No parameters in this octet | x | x | 0 | 0 | 0 | 0 | 0 | 0 |

Note - More that one (1) value can be selected.

TABLE 56

G.SHDSL General Parameters (Octet 1 - NPar(3) Coding)

| G.SHDSL training parameters - NPar(3) | 8 | 7 | 6 | 5 | 4 | 3 | 2 | 1 |
|---|---|---|---|---|---|---|---|---|
| G.SHDSL general parameter #1 | x | x | x | x | x | x | x | 1 |
| G.SHDSL general parameter #2 | x | x | x | x | x | x | 1 | x |
| G.SHDSL general parameter #3 | x | x | x | x | x | 1 | x | x |
| G.SHDSL general parameter #4 | x | x | x | x | 1 | x | x | x |
| G.SHDSL general parameter #5 | x | x | x | 1 | x | x | x | x |
| Reserved | x | x | 1 | x | x | x | x | x |
| No parameters in this octet | x | x | 0 | 0 | 0 | 0 | 0 | 0 |

TABLE 57

G.SHDSL Training Parameters (Octet 2 - NPar(3) Coding)

| Data rate NPar(3)s | 8 | 7 | 6 | 5 | 4 | 3 | 2 | 1 |
|---|---|---|---|---|---|---|---|---|
| Unspecified by terminal | x | x | 0 | 0 | 0 | 0 | 0 | 0 |
| Data rate (bits 5–1 x 32 kbit/s) | x | x | 0 | x | x | x | x | x |
| Data rate (bits 5–1 x 64 kbit/s + 1024 kbit/s) | x | x | 1 | x | x | x | x | x |
| Data rate 1.544 Mbit/s | x | x | 1 | 1 | 1 | 1 | 1 | 0 |
| Reserved for allocation by the ITU-T | x | x | 1 | 1 | 1 | 1 | 1 | 1 |

TABLE 58

G.SHDSL Training Parameters (Octet 3 - NPar(3) Coding)

| G.SHDSL PBO level - NPar(3) coding | 8 | 7 | 6 | 5 | 4 | 3 | 2 | 1 |
|---|---|---|---|---|---|---|---|---|
| PBO (dB) (bits 6–1 × –1 dB) | x | x | x | x | x | x | x | x |
| Reserved | x | x | 1 | 1 | 1 | 1 | 1 | 1 |

TABLE 59

G.SHDSL PMMS Initiate Using Set NPar(3) Coding

| G.SHDSL PMMS initiate - NPar(3) | 8 | 7 | 6 | 5 | 4 | 3 | 2 | 1 |
|---|---|---|---|---|---|---|---|---|
| G.SHDSL PMMS set #1 (1024 kbit/s; nominal power; 50 ms; 5 ms) | x | x | x | x | x | x | x | 1 |
| G.SHDSL PMMS set #2 (256 kbit/s; nominal power; 50 ms; 5 ms) | x | x | x | x | x | x | 1 | x |
| G.SHDSL PMMS set #3 (1024 kbit/s; –30 dB power; 50 ms; 5 ms) | x | x | x | x | x | 1 | x | x |
| G.SHDSL PMMS set #4 (1024 kbit/s; –60 dB power; 50 ms; 5 ms) | x | x | x | x | 1 | x | x | x |
| G.SHDSL PMMS set #4 (1024 kbit/s; –60 dB power; 500 ms; 50 ms) | x | x | x | 1 | x | x | x | x |
| Reserved | x | x | 1 | x | x | x | x | x |
| No parameters in this octet | x | x | 0 | 0 | 0 | 0 | 0 | 0 |

TABLE 60

PMMS - Standard Parameter Measurements Procedure Example

| Transmit Unit | Name | # | Contents of octets |
|---|---|---|---|
| HSTU-R | MR-P | 1 | Table 53 x010 0000 (Select G.shdsl)<br>Table 54 xx00 0010 (start PMMS measurements using set in Table 55)<br>Table 55 xx00 0100 (downstream PMMS measurements using set in Table 59)<br>Table 59 xx00 0001 (set #1) [downstream] |
| HSTU-C | MS | 2 | Table 53 x010 0000 (Select G.shdsl)<br>Table 54 xx00 0010 (start PMMS measurements using set in Table 55)<br>Table 55 xx00 1100 (downstream/downstream PMMS measurements using set in Table 59)<br>Table 59 xx00 0001 (set #1) [downstream]<br>Table 59 xx00 0001 (set #1) [upstream] |
| HSTU-R | ACK | 3 | This message Acknowledges selection of PMMS |
| HSTU-C | PM$_{CH}$ | 4 | |
| HSTU-R | PM$_{RH}$ | 5 | |
| HSTU-R | MR-P | 6 | Table 53 x010 0000 (Select G.shdsl)<br>Table 54 xx00 0001 (Initiate training (using parameter values from Table 55)<br>Table 55 xx00 0001 (Initiate training (using downstream parameter values from Tables 57 and 58)<br>Table 56 xxxx xxxx General parameters<br>[Table 57 xx00 0010 (128 kbit/s) [downstream]<br>[Table 58 xx00 0110 (6 dB) [downstream] |
| HSTU-C | MS | 7 | Table 53 x010 0000 (Select G.shdsl)<br>Table 54 xx00 0001 (Initiate training (using parameter values from Table 55)<br>Table 55 xx00 0011 (Initiate training (using parameter values from Tables 57 and 58)<br>Table 56 xxxx xxxx General parameters<br>[Table 57 xx00 0010 (128 kbit/s) [downstream]<br>[Table 58 xx00 0110 (6 dB) [downstream]<br>[Table 57 xx00 0010 (128 kbit/s) [upstream]<br>[Table 58 xx00 0110 (6 dB) [upstream] |
| HSTU-R | ACK | 8 | This message Acknowledges selection of the G.SHDSL using the specified downstream (an upstream) PBO |
| — | Training | — | G.SHDSL training begins. |

B. Explicit Parameter Measurements

This measurement is similar to the Standard Set of Parameter Measurements described above, however, more octets are required to transmit the explicit parameter information.

In the following discussion, PMM signals are used in the activation of G.shdsl. Specifically, 2-PAM (see Section 6.2.1 of the above-mentioned G.shdsl Draft) at a specific data/symbol rate is used for G.shdsl training. Example encodings of G.shdsl activation data rates are proposed below.

Although the discussion is described in terms of data rate parameters, it is noted that other parameters, including, but not limited to, symbol rate, PAM level, etc., may be used and negotiated without departing from the spirit and/or scope of the current invention.

Assume a data rate resolution of 32 kbit/s for data transmissions up to 1 Mbit/s, and a data rate resolution of 64 kbit/s for data transmissions above 1 Mbit/s. However, it is noted that other resolutions can be encoded in a similar manner. Table 62 illustrates how to encoded the minimum requirements of 192 kbit/sec to 2304 kbit/s with a resolution of 64 kbit/s. It is noted that G.shdsl is designed such that slightly asymmetric upstream and downstream rates may be employed.

The $PM_{RH}$ and $PM_{CH}$ signals may contain multiple signal segments. For example, several data rates for a given power level, or several power levels for a given data, may be sent to measure the PBO values. Thus, each segment is described with a "4-tuple" that comprises:

(a) Data rate;

(b) Power level (from nominal);

(c) Duration; and (d) Guard time (e.g., amount of silence after the signal before the next signal will be sent).

While the discussion herein is made with reference to specific time resolution bases, it is understood that such time resolution bases may be modified without departing from the spirit and/or scope of the invention.

The octet coding of the MR-P and MS messages is shown in Tables 53 through 55, and Tables 61 through 66. An example procedure is shown in Table 67.

TABLE 61

G.shdsl Number of PMM Segments Octet

| PMM segments NPar(3)s | 8 | 7 | 6 | 5 | 4 | 3 | 2 | 1 |
|---|---|---|---|---|---|---|---|---|
| Unspecified by terminal | x | x | 0 | 0 | 0 | 0 | 0 | 0 |
| # segments (bits 6–1) | x | x | x | x | x | x | x | x |
| Reserved | x | x | 1 | 1 | 1 | 1 | 1 | 1 |

TABLE 62

G.shdsl Data Rate Octet

| Data rate NPar(3)s | 8 | 7 | 6 | 5 | 4 | 3 | 2 | 1 |
|---|---|---|---|---|---|---|---|---|
| Unspecified by terminal | x | x | 0 | 0 | 0 | 0 | 0 | 0 |
| Data rate (bits 5–1 × 32 kbit/s) | x | x | 0 | x | x | x | x | x |
| Data rate (bits 5–1 × 64 kbit/s + 1024 kbit/s) | x | x | 1 | x | x | x | x | x |
| Data rate 1.544 Mbit/s | x | x | 1 | 1 | 1 | 1 | 1 | 0 |
| Reserved | x | x | 1 | 1 | 1 | 1 | 1 | 1 |

TABLE 63

Example Values Data Rate Encoding

| 6 | 5 | 4 | 3 | 2 | 1 | Result |
|---|---|---|---|---|---|---|
| 0 | 0 | 0 | 0 | 0 | 0 | Unspecified |
| 0 | 0 | 0 | 1 | 1 | 0 | 6 × 32 = 192 kbit/s |
| 0 | 1 | 1 | 1 | 1 | 1 | 31 × 32 = 992 kbit/s |
| 1 | 0 | 0 | 0 | 0 | 0 | 0 × 64 + 1024 = 1024 kbit/s |
| 1 | 0 | 0 | 0 | 1 | 1 | 3 × 64 + 1024 = 1216 kbit/s |
| 1 | 1 | 1 | 1 | 0 | 1 | 29 × 64 + 1024 = 2880 kbit/s |
| 1 | 1 | 1 | 1 | 1 | 0 | 1544 kbit/s |
| 1 | 1 | 1 | 1 | 1 | 1 | Reserved |

TABLE 64

G.shdsl Power Level Octet

| G.SHDSL PBO level - NPar(3) coding | 8 | 7 | 6 | 5 | 4 | 3 | 2 | 1 |
|---|---|---|---|---|---|---|---|---|
| PBO (dB) (bits 6–1 × –1 dB) | x | x | x | x | x | x | x | x |
| Reserved | x | x | 1 | 1 | 1 | 1 | 1 | 1 |

TABLE 65

G.shdsl PMM Segment Duration Octet

| Data rate NPar(3)s | 8 | 7 | 6 | 5 | 4 | 3 | 2 | 1 |
|---|---|---|---|---|---|---|---|---|
| Duration (bits 5–1 × 20 ms) | x | x | 0 | x | x | x | x | x |
| Duration (bits 5–1 × 100 ms + 700 ms) | x | x | 1 | x | x | x | x | x |
| Reserved | x | x | 1 | 1 | 1 | 1 | 1 | 1 |

TABLE 66

G.shdsl PMM Segment Guard Octet

| Data rate NPar(3)s | 8 | 7 | 6 | 5 | 4 | 3 | 2 | 1 |
|---|---|---|---|---|---|---|---|---|
| Duration (bits 6–1 × 5 ms) | x | x | x | x | x | x | x | x |
| Reserved | x | x | 1 | 1 | 1 | 1 | 1 | 1 |

TABLE 67

PMMS (Explicit Measurements Procedure For PMMS Example)

| Transmit Unit | Name | # | Contents of octets |
|---|---|---|---|
| HSTU-R | MR-P | 1 | Table 53 x010 0000 (Select G.shdsl) |
| | | | Table 54 xx00 0010 (start PMMS measurements using set in Table 55) |
| | | | Table 55 xx01 0000 (downstream PMMS measurements using explicit parameters in Table 61 and multiple copies of Tables 62, 64, 65, and 66) |

TABLE 67-continued

PMMS (Explicit Measurements Procedure For PMMS Example)

| Transmit Unit | Name | # | Contents of octets |
|---|---|---|---|
| | | | Table 61 xx00 0011 Number of segments [downstream] (e.g.: 3) |
| | | | [Table 62 xx10 0000 Data rate [downstream] (e.g.: 1024 kbit/s) |
| | | | [Table 64 xx00 1010 Power level [downstream] (e.g.: −10 dB) |
| | | | [Table 65 xx00 0001 Duration [downstream,] (e.g.: 20 ms) |
| | | | [Table 66 xx00 0100 Guard [downstream] (e.g.: 20 ms) |
| | | | [Table 62 xx10 0000 Data rate [downstream] (e.g.: 1024 kbit/s) |
| | | | [Table 64 xx01 0100 Power level [downstream] (e.g.: −20 dB) |
| | | | [Table 65 xx00 1010 Duration [downstream,] (e.g.: 200 ms) |
| | | | [Table 66 xx00 0100 Guard [downstream] (e.g.: 20 ms) |
| | | | [Table 62 xx00 1000 Data rate [downstream] (e.g.: 256 kbit/s) |
| | | | [Table 64 xx00 1010 Power level [downstream] (e.g.: −10 dB) |
| | | | [Table 65 xx00 0001 Duration [downstream,] (e.g.: 20 ms) |
| | | | [Table 66 xx00 0001 Guard [downstream] (e.g.: 20 ms) |
| HSTU-C | MS | 2 | Table 53 x010 0000 (Select G.shdsl) |
| | | | Table 54 xx00 0010 (start PMMS measurements using set in Table 55) |
| | | | Table 55 xx11 0000 (downstream and upstream PMMS measurements using explicit parameters in Table 61 and multiple copies of Tables 62, 64, 65, and 66) |
| | | | Table 61 xx00 0011 Number of segments [downstream] (e.g.: 3) |
| | | | [Table 62 xx10 0000 Data rate [downstream] (e.g.: 1024 kbit/s) |
| | | | [Table 64 xx00 1010 Power level [downstream] (e.g.: −10 dB) |
| | | | [Table 65 xx00 0001 Duration [downstream,] (e.g.: 20 ms) |
| | | | [Table 66 xx00 0100 Guard [downstream] (e.g.: 20 ms) |
| | | | [Table 62 xx10 0000 Data rate [downstream] (e.g.: 1024 kbit/s) |
| | | | [Table 64 xx01 0100 Power level [downstream] (e.g.: −20 dB) |
| | | | [Table 65 xx00 1010 Duration [downstream,] (e.g.: 200 ms) |
| | | | [Table 66 xx00 0100 Guard [downstream] (e.g.: 20 ms) |
| | | | [Table 62 xx00 1000 Data rate [downstream] (e.g.: 256 kbit/s) |
| | | | [Table 64 xx00 1010 Power level [downstream] (e.g.: −10 dB) |
| | | | [Table 65 xx00 0001 Duration [downstream,] (e.g.: 20 ms) |
| | | | [Table 66 xx00 0001 Guard [downstream] (e.g.: 20 ms) |
| | | | Table 61 xx00 0001 Number of segments [upstream] (e.g.: 1) |
| | | | [Table 62 xx10 0000 Data rate [upstream] (e.g.: 1024 kbit/s) |
| | | | [Table 64 xx00 1010 Power level [upstream] (e.g.: −10 dB) |
| | | | [Table 65 xx00 0001 Duration [upstream,] (e.g.: 20 ms) |
| | | | [Table 66 xx00 0100 Guard [upstream] (e.g.: 20 ms) |
| HSTU-R | ACK | 3 | This message Acknowledges selection of PMMS |
| HSTU-C | $PM_{CH}$ | 4 | |
| HSTU-R | $PM_{RH}$ | 5 | |
| HSTU-R | MR-P | 6 | (same as example in Table 60, above) |
| HSTU-C | MS | 7 | (same as example in Table 60, above) |
| HSTU-R | ACK | 8 | (same as example in Table 60, above) |
| — | Training | — | G.SHDSL training begins. |

Fifth Embodiment

A discussion will now be provided with respect to another embodiment of the invention. After the PMMS, specific parameters for the power back off (PBO) are selected by the terminals and negotiated in a Transaction B. The parameters are selected by evaluating the frequency dependent signal-to-noise ratio and distance estimation from the received power difference from the transmitted signal so as to use the minimal necessary frequency dependent transmit power for the terminal to adequate receive the signal.

The session summary for this embodiment is similar to that described above with respect to the other embodiments. However, during the PMM, the xTU-R sends the first signals and then, the xTU-C sends signals. This allows the xTU-R to acknowledge the signal sent from the xTU-C with a second ITU-T Recommendation G.994.1 MR-P message sent from the HSTU-R. It is noted that the characteristics and timing of the PMM signals are predetermined in the transaction B exchange.

After each side has performed their measurements and analysis, they inform the opposite side of their specific value request of the PBO and possible parameters such as data rates. This is a request with parameters so it would require the HSTU-R to use MR-P and the HSTU-C to use MS in a B transaction.

Figure 10:
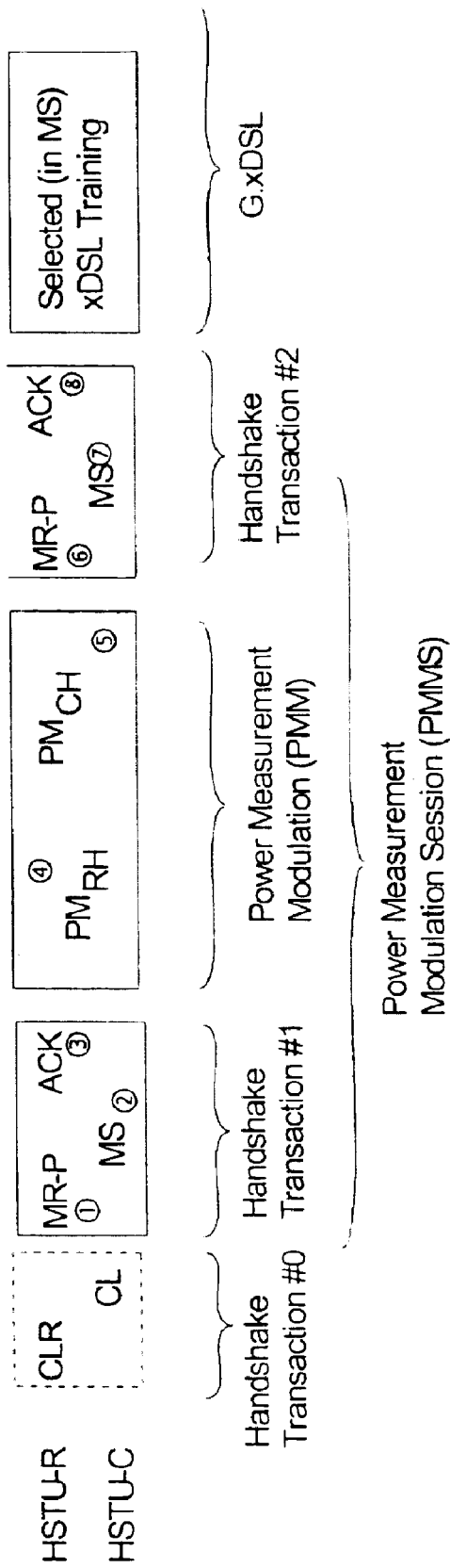
FIG. 10 illustrates another example of the PMMS session using a message MR-P that is derived from existing messages and transactions, in which signals are transmitted to measure for PBO.

An overview of the contents of each message is given in Table 68 (and illustrated in FIG. 10). The contents of this Table differs from the contents of Table 52 in that the handshaking steps 4 and 5 are reversed. That is, Table 68 illustrates that $PM_{RH}$ is sent prior to $PM_{CH}$.

TABLE 68

PMMS (Standard Measurements)

| Transmit Unit | Message/ Signal Name | # | Description |
|---|---|---|---|
| HSTU-R (optional) | CLR | 0a | The message includes information on the capabilities of types of PMM signals that the HSTU-R can transmit |
| HSTU-C (optional) | CL | 0b | The message includes information on the capabilities of types of PMM signals that the HSTU-C can transmit |
| HSTU-R | MR-P (PRR) | 1 | The message is a request for the PMM mode, and includes the parameters (or category choice which represents a set of predefined parameters) of the desired signal to be transmitted by the HSTU-C |
| HSTU-C | MS (PCR) | 2 | The message: is a selection for the PMM mode, and includes the parameters (or category choice which represents a set of predefined parameters) of the desired signal to be transmitted by the HSTU-R; and echoes the parameters (or category choice which represents a set of predefined parameters) of the desired signal to be transmitted by the HSTU-C |
| HSTU-R | ACK | 3 | The message Acknowledges selection of PMM |
| HSTU-R | $PM_{RH}$ | 4 | This signal allows the HSTU-C to measure the line conditions and power loss |
| HSTU-C | $PM_{CH}$ | 5 | This signal allows the HSTU-R to measure the line conditions and power loss |
| HSTU-R | MR-P (PRHA) | 6 | The message: acknowledges reception of $PM_{CH}$; is a request for a specific xDSL modulation mode (with possible data rate preferences); and contains a request for a parameterised PBO template for each band in the downstream direction |
| HSTU-C | MS (PCHA) | 7 | The message: acknowledges reception of $PM_{RH}$; is a selection for a specific xDSL modulation mode (with possible data rate preferences); contains a parameterised PBO template for each band in the downstream direction; and contains a parameterised PBO template for each band in the upstream direction |
| HSTU-R | ACK | 8 | The message Acknowledges the upstream PBO request values and selected mode of operation |
| — | Training | — | Training begins |

Figure 11:
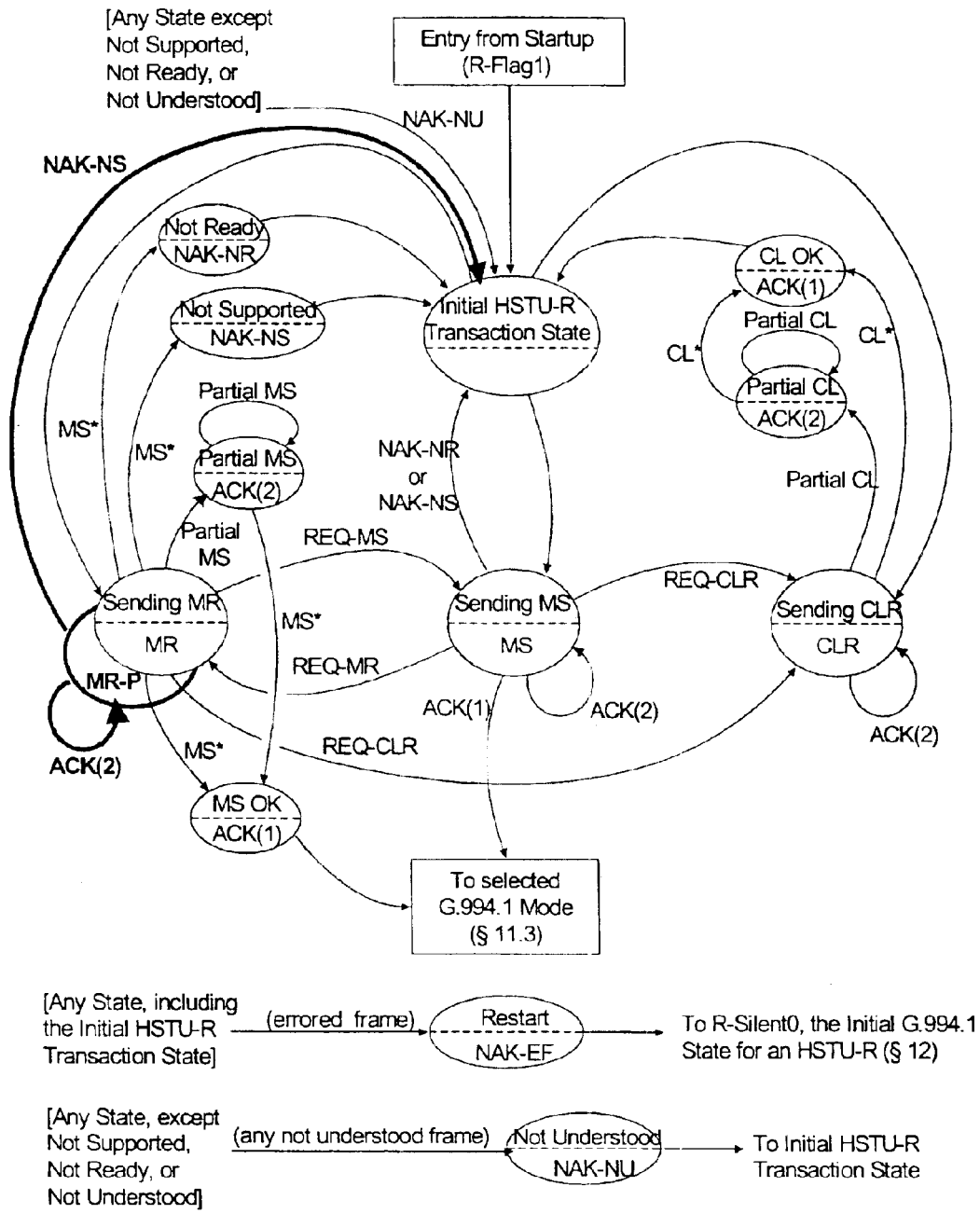
FIG. 11 illustrates a state diagram for a handshaking portion of an xDSL remote terminal unit (HSTU-R) in which the instant invention is incorporated.
Figure 12:
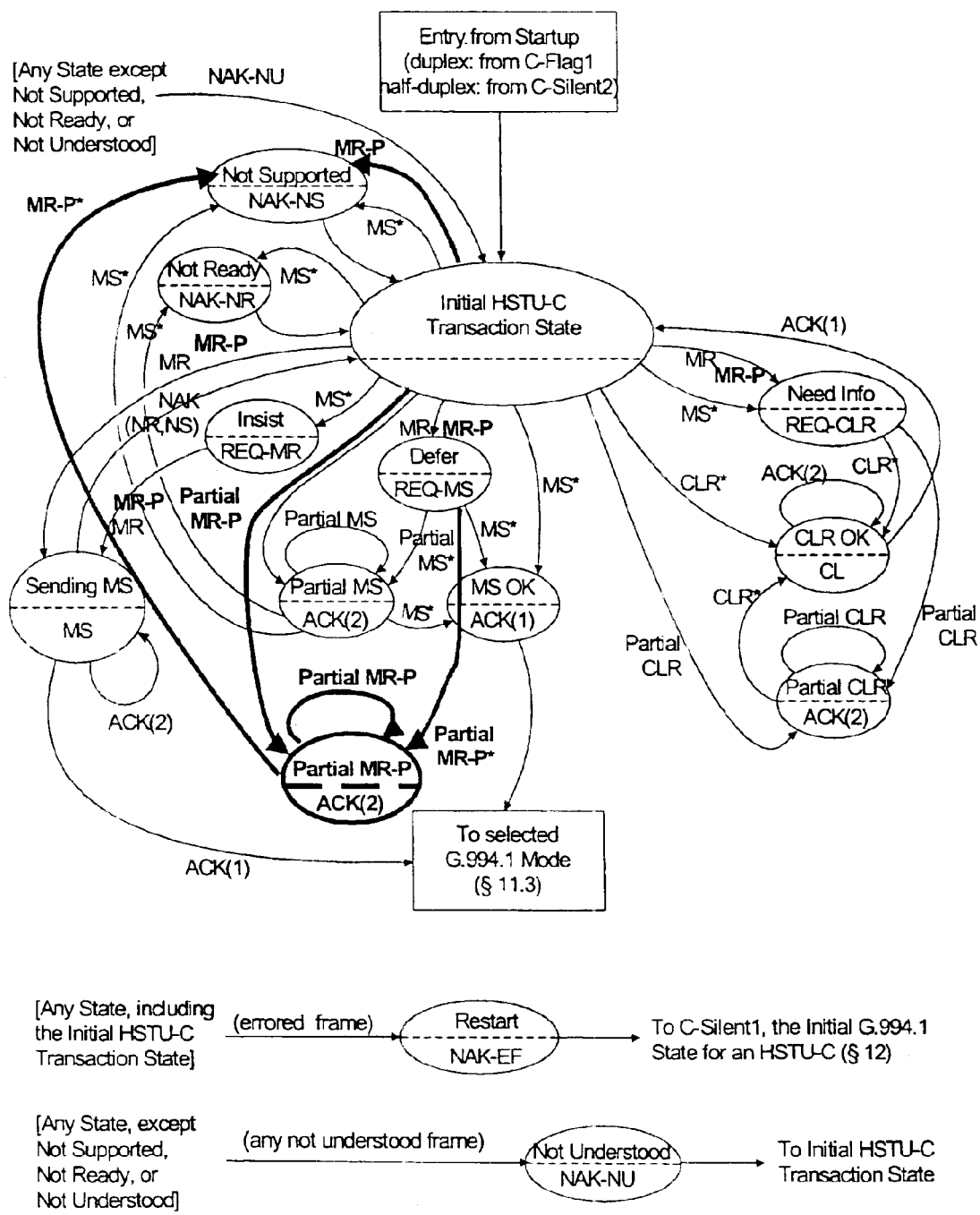
FIG. 12 illustrates a state diagram for a handshaking portion of an xDSL central terminal unit (HSTU-C) in which the instant invention is incorporated.

Some (but not all possible) non-typical transaction scenarios will now be discussed. State diagrams, using ITU-T Recommendation G.994.1 as an example for the HSTU-R and HSTU-C, are shown in FIGS. 11 and 12, respectively, which show "legal" state transitions. New components are shown in bold. Note that message names shown in FIGS. 11 and 12 that are followed by an asterisk (*) indicate that the state transition may be taken upon reception of a complete message, or upon the reception of one or more segments of the message.

For the MR-P message state bubble in FIG. 11, it also includes the entrance and exit arrow of the MR state bubble.

If the MR-P message were to become lengthy, it would need to be segmented Segmenting the MR message was not necessary since it could not contain any parameters and was always of short length. Thus, the segment acknowledge command "ACK(2)" must be allowed.

As the new message MR-P carries a higher revision level that the existing equipment, the message NAK-NS may be a response to an MR-P to say the message—type—is not supported. However, NAK-NS cannot mean the requested parameters are not supported, since they can be overridden by the MS message.

NAK-EF and NAK-CD are allowed for any message. Likewise REQ-CLR is appropriate for MR-P as well as MR to indicate that a capabilities exchange should be performed before the mode request.

The use of REQ-MS would be acceptable to keep parity with MR; however its use in practice would not make much sense, since the HSTU-C could see the parameters that the HSTU-R would have sent in its MS message in the contents of the MR-P message.

Since no mode is being selected (e.g., a mode is only being requested), "ACK(1)" is not an appropriate response. Since NAK-NR is not sent in response to a CLR, it also should not be sent in response to an MR-P. Similarly, sending Request MR in response to a "REQ-MR" message would be a meaningless response to an MR or MR-P message.

Since message MR-P is related to MR, it should have a related message number. All of the bits except bit 3 are the same between MR and MR-P. Bit 3 is set to a "1" to indicate MR-P instead of MR, as shown in Table 69, below.

TABLE 69

| Message type | Message Type Field Format | | | | | | | |
|---|---|---|---|---|---|---|---|---|
| | Bit numbers | | | | | | | |
| | 8 | 7 | 6 | 5 | 4 | 3 | 2 | 1 |
| MS | 0 | 0 | 0 | 0 | 0 | 0 | 0 | 0 |
| MR | 0 | 0 | 0 | 0 | 0 | 0 | 0 | 1 |
| MR-P | 0 | 0 | 0 | 0 | 0 | 1 | 0 | 1 |
| CL | 0 | 0 | 0 | 0 | 0 | 0 | 1 | 0 |

TABLE 69-continued

Message Type Field Format

| Message type | Bit numbers | | | | | | | |
|---|---|---|---|---|---|---|---|---|
| | 8 | 7 | 6 | 5 | 4 | 3 | 2 | 1 |
| CLR | 0 | 0 | 0 | 0 | 0 | 0 | 1 | 1 |
| ACK(1) | 0 | 0 | 0 | 1 | 0 | 0 | 0 | 0 |
| ACK(2) | 0 | 0 | 0 | 1 | 0 | 0 | 0 | 1 |
| NAK-EF | 0 | 0 | 1 | 0 | 0 | 0 | 0 | 0 |
| NAK-NR | 0 | 0 | 1 | 0 | 0 | 0 | 0 | 1 |
| NAK-NS | 0 | 0 | 1 | 0 | 0 | 0 | 1 | 0 |
| NAK-CD | 0 | 0 | 1 | 0 | 0 | 0 | 1 | 1 |
| REQ-MS | 0 | 0 | 1 | 1 | 0 | 1 | 0 | 0 |
| REQ-MR | 0 | 0 | 1 | 1 | 0 | 1 | 0 | 1 |
| REQ-CLR | 0 | 0 | 1 | 1 | 0 | 1 | 1 | 1 |

Figure 13:
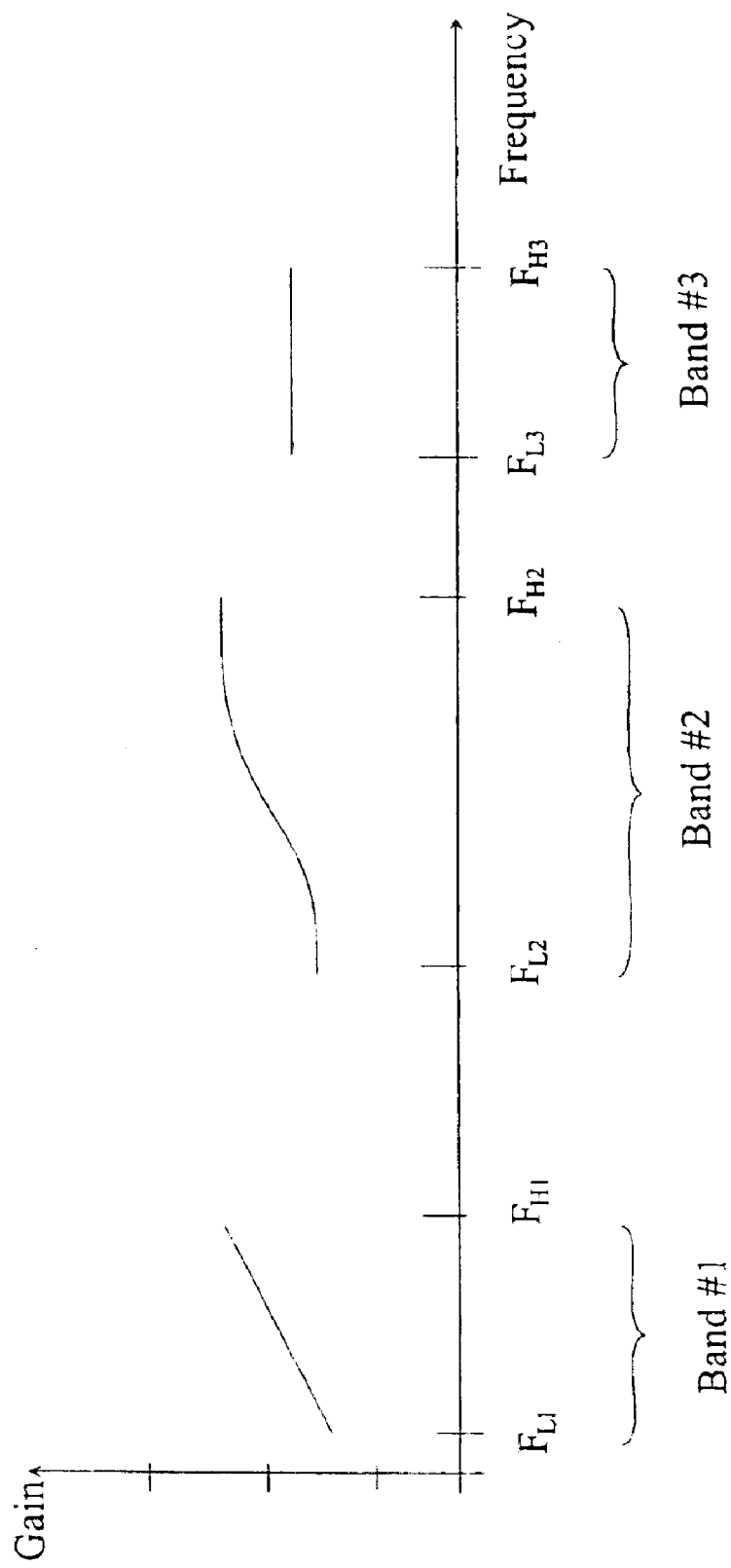
FIG. 13 illustrates a dividing of signals associated with the PMMS session into a plurality of frequency bands.
Figure 14:
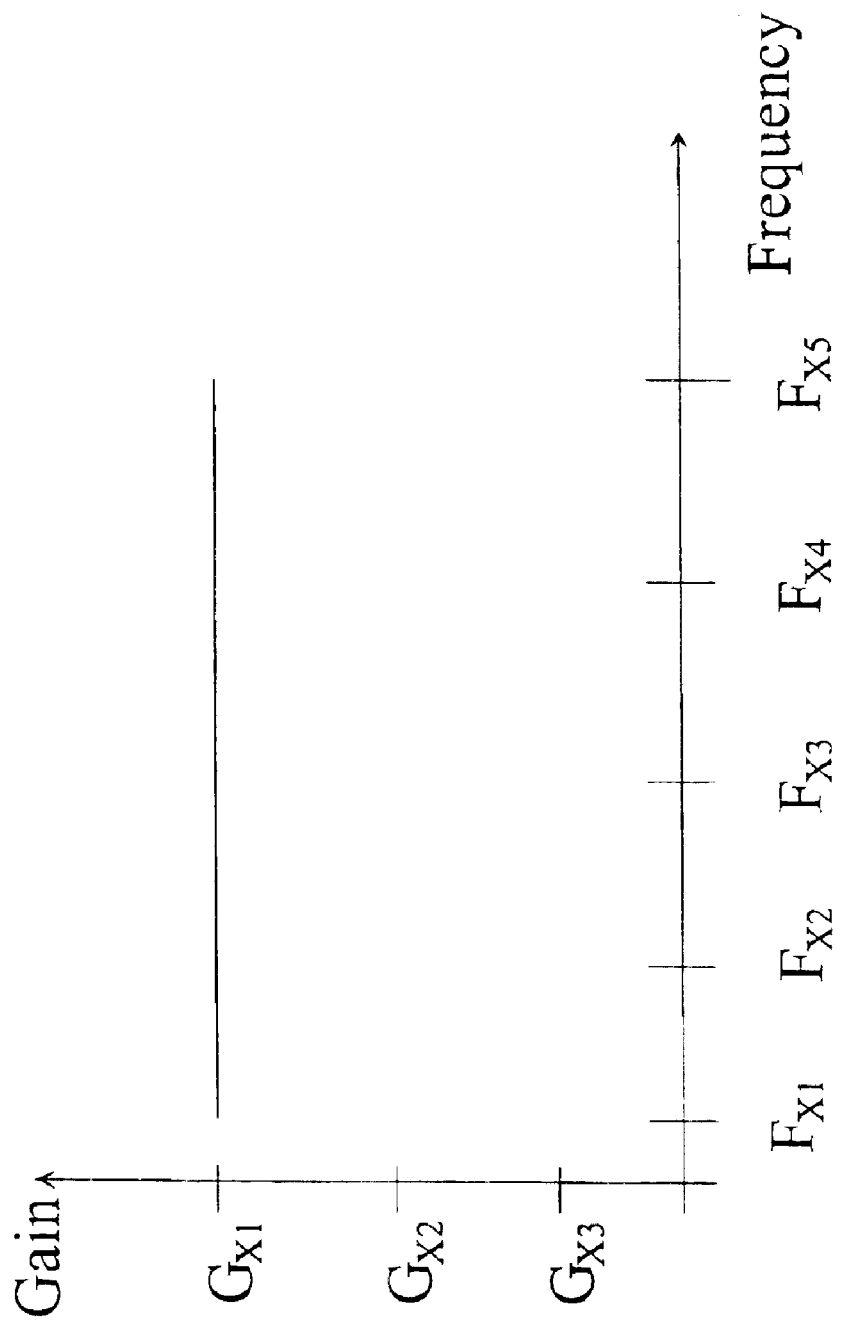
FIG. 14 illustrates a flat template that shapes a transmit spectrum of a frequency band.
Figure 15:
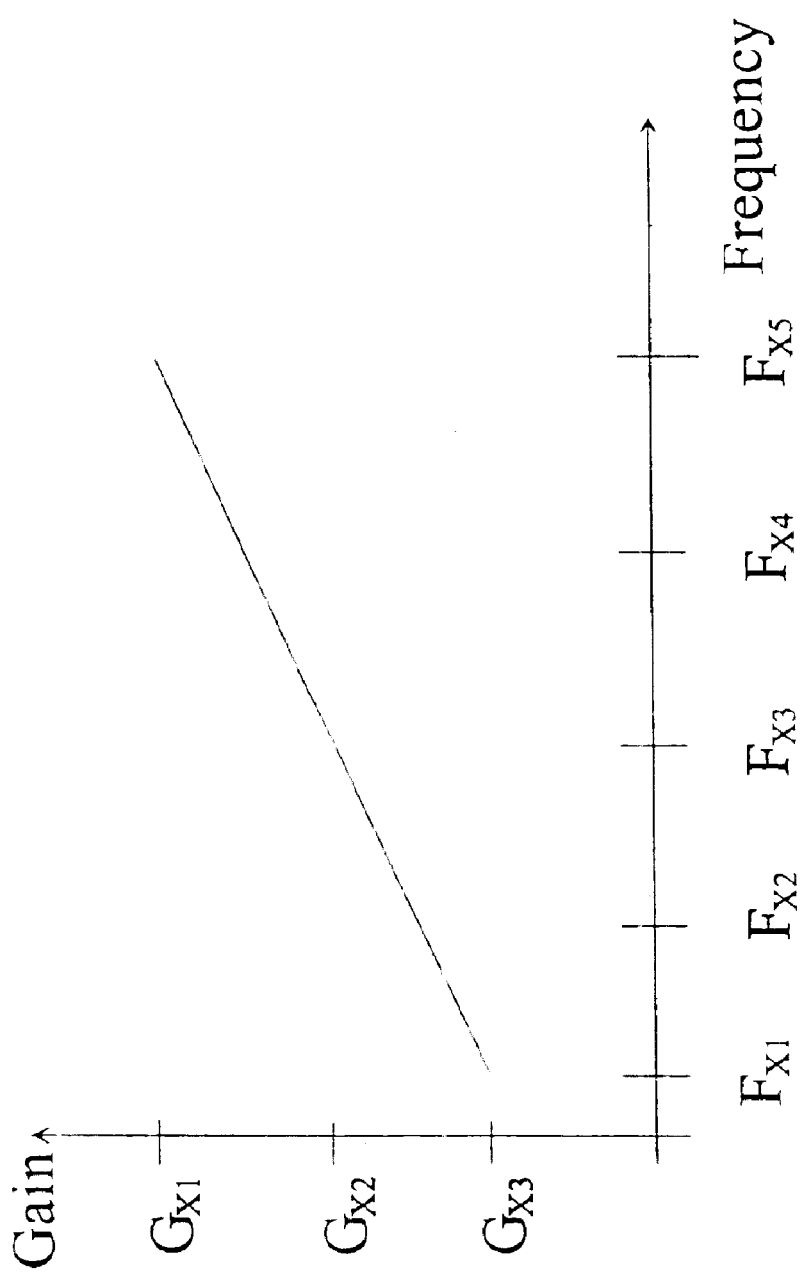
FIG. 15 illustrates a sloped template that shapes a transmit spectrum of a frequency band.

The transmit band is divided into one or more bands, as shown in FIG. 13. Each band is delimited by a lower frequency ($F_{LX}$) and a higher frequency ($F_{HX}$). For each band, a template is chosen to shape the transmit spectrum within that band. Example transmit templates are shown in FIGS. 14 through 17.

Each template has a characteristic shape (identified by it's template number) and parameters to indicate how the template will be used in the band. The gain parameters are $G_{X1}$, $G_{X2}$, and $G_{X3}$. The frequency parameters are $F_{X1}$, $F_{X2}$, $F_{X3}$, $F_{X4}$, and $F_{X5}$. The subscripted X indicates a place holder for which band number is being described. Various combinations of the parameters allow the transmit spectrum to be customized according to the optimum needs of the power back off (PBO).

For flat template #1 (see FIG. 14), parameters $G_{X2}$, $G_{X3}$, $F_{X2}$, $F_{X3}$, and $FX_4$, do not need to be specified.

For sloped template #2 (see FIG. 15), parameters $G_{X2}$, $F_{X2}$, $F_{X3}$, and $F_{X4}$, do not need to be specified.

Figure 16:
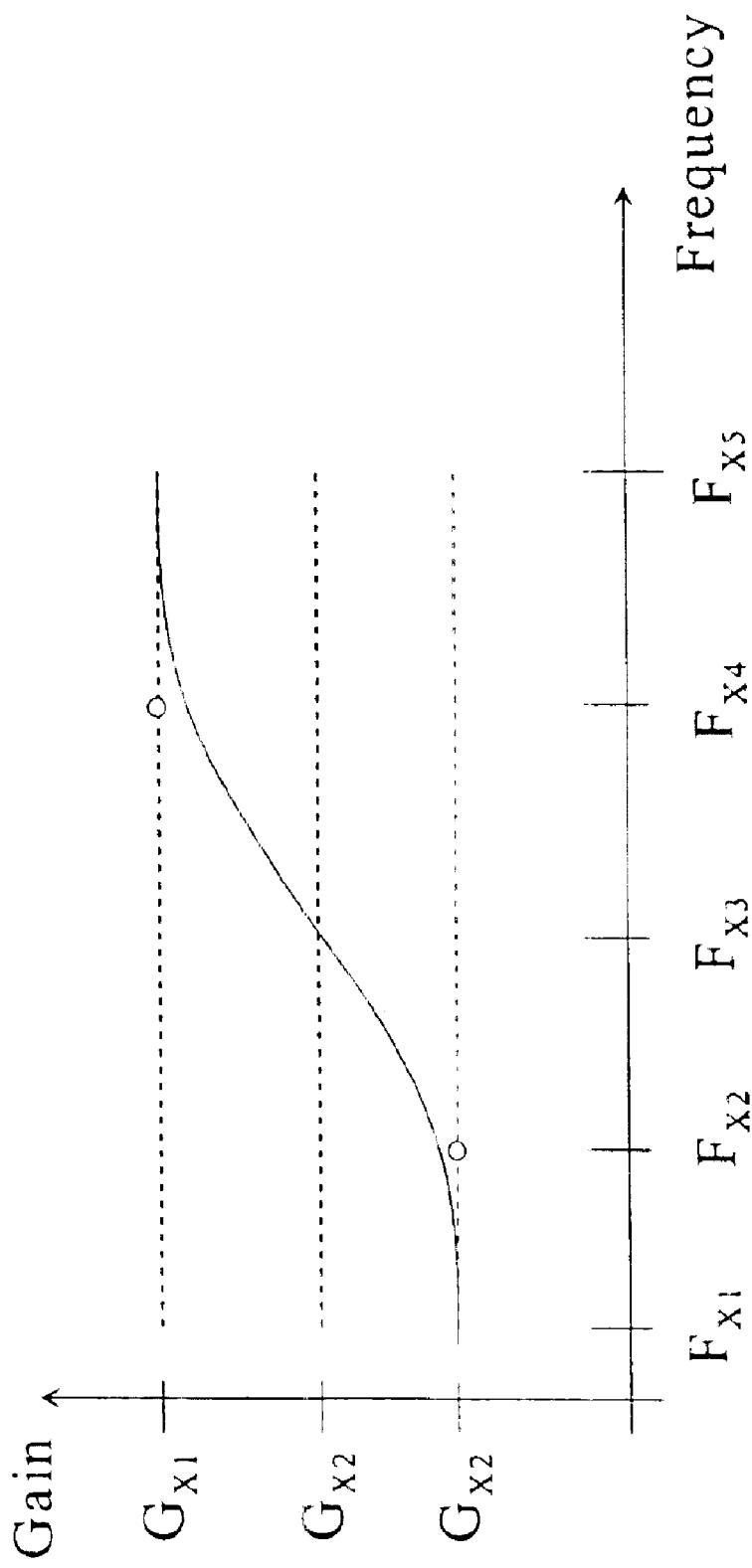
FIGS. 16 and 17 illustrate B-Spline templates that shape a transmit spectrum of a frequency band.
Figure 17:
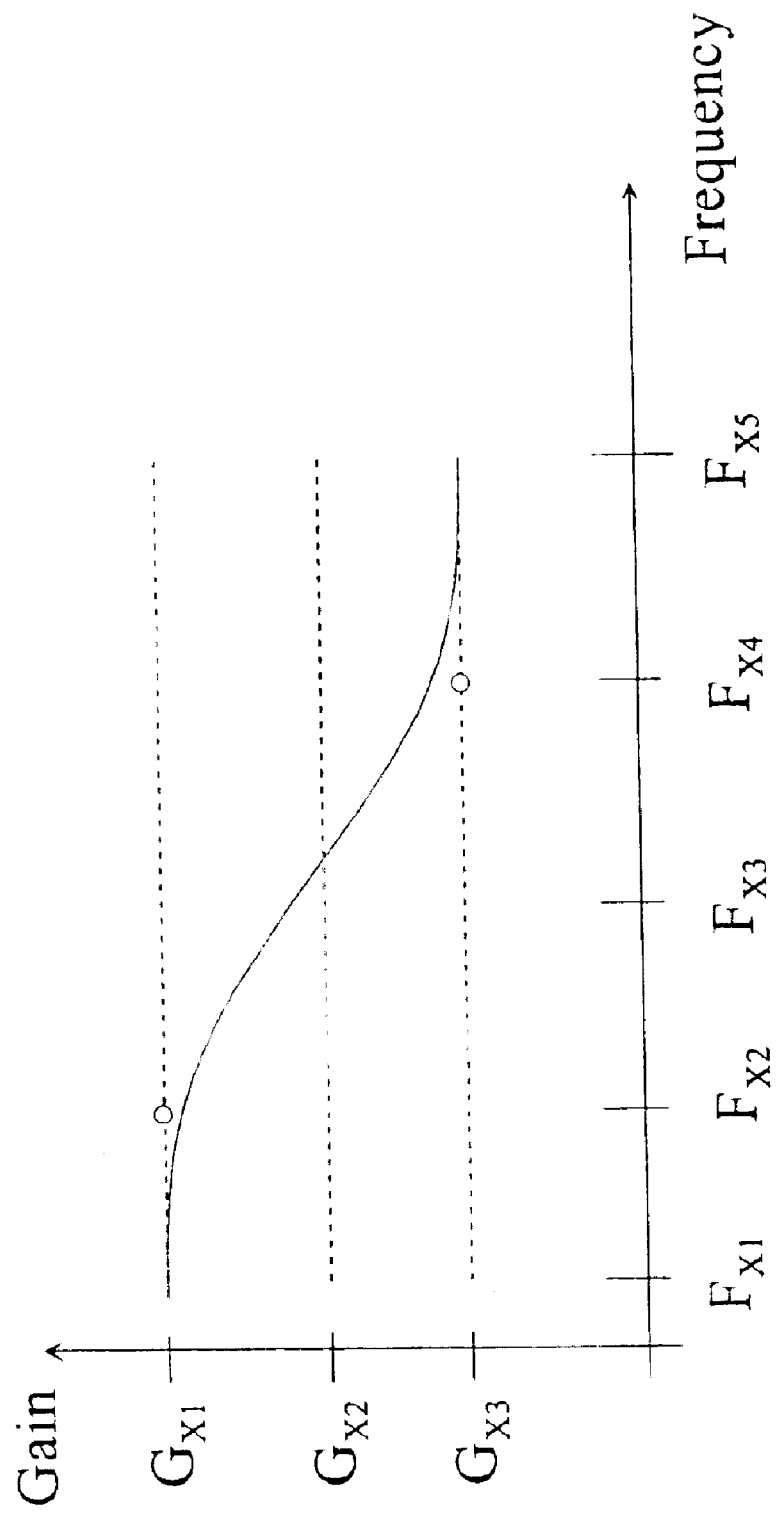

For B-spline template #3 (see FIG. 16) and #4 (see FIG. 17), parameters $F_{X2}$, and $F_{X4}$ represent the B-spline breakpoints shown by circles in FIGS. 16 and 17. The values for the various $F_{LX}$ and $F_{HX}$ are predetermined for each xDSL. The specification and relationship for each parameter is shown in Table 70, below. The general order of the parameters in the message is as shown in Table 60, above.

TABLE 70

G.SHDSL PBO Initiate - NPar(3) Coding

| G.SHDSL PRO initiate - NPar(3) | 8 | 7 | 6 | 5 | 4 | 3 | 2 | 1 |
|---|---|---|---|---|---|---|---|---|
| Octet 01 - Band # | x | x | x | x | x | x | x | x |
| Octet 02 - Template # | x | x | x | x | x | x | x | x |
| Octet 03 - PBO $G_{X1}$ = bits 6–1 × 1 dB | x | x | x | x | x | x | x | x |
| Octet 04 - PBO $G_{X2}$ = $G_{X1}$ - bits 5–1 × 1 dB bit 6–1 = 111111 = not specified by terminal | x | x | x | x | x | x | x | x |
| Octet 05 - PBO $G_{X3}$ = $G_{X1}$ - bits 5–1 × 1 dB bit 6–1 = 111111 = not specified by terminal | x | x | x | x | x | x | x | x |
| Octet 06 - PBO $F_{X1}$ = $F_L$ + ($F_H$–$F_L$) × (bits 6–1)/64 | x | x | x | x | x | x | x | x |
| Octet 07 - PBO $F_{X2}$ = $F_L$ + ($F_H$–$F_L$) × (bits 6–1)/64 bit 6–1 = 111111 = not specified by terminal | x | x | x | x | x | x | x | x |
| Octet 08 - PBO $F_{X3}$ = $F_L$ + ($F_H$–$F_L$) × (bits 6–1)/64 bit 6–1 = 111111 = not specified by terminal | x | x | x | x | x | x | x | x |
| Octet 09 - PBO $F_{X4}$ = $F_H$ - ($F_H$–$F_L$) × (bits 6–1)/64 bit 6–1 = 111111 = not specified by terminal | x | x | x | x | x | x | x | x |
| Octet 10 - PBO $F_{X5}$ = $F_H$ - ($F_H$–$F_L$) × (bits 6–1)/64 bit 6–1 = 111111 = not specified by terminal | x | x | x | x | x | x | x | x |

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims. For example, while the present invention has been described with respect to the xDSL procedure defined in ITU-T Recommendation G.994.1, the present invention is not limited to being used with this procedure, but is equally applicable with other procedures, such as, for example, ITU-T Recommendations V.8 and V.8bis. The methods described herein comprise dedicated hardware implementations including, but not limited to, application specific integrated circuits, programmable logic arrays and other hardware devices constructed to implement the methods described herein. However, it is understood that the invention may be implemented in software (e.g., a software modem) that is executed by a computer. Furthermore, alternative software implementations including, but not limited to, distributed processing, or component/object distributed processing, parallel processing, or virtual machine processing can also be constructed to implement the methods described herein. In addition, although the present specification describes components and functions implemented in the embodiments with reference to particular standards and protocols, the invention is not limited to such standards and protocols. The standards for Internet and other packet-switched network transmission (e.g., TCP/IP, UDP/IP, HTML, SHTML, DHTML, XML, PPP, FTP, SMTP, ME); peripheral control (IRDA; RS232C; USB; ISA; ExCA; PCMCIA); and public telephone networks (ISDN, ATM, xDSL) represent examples of the state of the art. Such standards are periodically superseded by faster or more efficient equivalents having essentially the same functions. Replacement standards and protocols having the same functions are considered equivalents.

What is claimed is:

1. A communication apparatus selectively connectable to a central communication apparatus, comprising:
   a transmitter that transmits a request signal that request the central communication apparatus to transmit a plurality of first power measurement signals; and
   a receiver that receives a plurality of first message signals and said plurality of first power measurement signals, transmitted by the central communication apparatus, said plurality of first message signals requesting the communication apparatus to transmit a plurality of second power measurement signals, said plurality of first power measurement signals being transmitted utilizing different carrier frequencies, said transmitter transmitting a plurality of second message signals and said plurality of second power measurement signals to the central communication apparatus after receiving said plurality of first message signals and said plurality of first power measurement signals, said plurality of second message signals confirming that said plurality of first power measurement signals have been received by the communication apparatus, said plurality of second power measurement signals being transmitted utilizing different carrier frequencies.

2. The communication apparatus of claim 1, wherein said receiver receives a third message signal representing a confirmation that said plurality of second power measurement signals were received by the central communication apparatus.

3. The communication apparatus of claim 1, wherein said plurality of second message signals are transmitted utilizing carrier frequencies that differ from carrier frequencies utilized by said plurality of first message signals.

4. The communication apparatus of claim 3, wherein said carrier frequencies utilized by said plurality of second message signals comprise 9 times a base family frequency, 17 times said base family frequency, and 25 times said base family frequency.

5. The communication apparatus of claim 4, wherein said base family frequency comprises one of 4.3125 kHz and 4.000 kHz.

6. The communication apparatus of claim 1, wherein said plurality of first power measurement signals and said plurality of second power measurement signals are transmitted utilizing a same plurality of carrier frequencies.

7. A central communication apparatus selectively connectable to a remote communication apparatus, comprising:
   a receiver that receives a request signal from the remote communication apparatus requesting that the central communication apparatus transmit a plurality of first power measurement signals; and
   a transmitter that transmits said plurality of first message signals and said plurality of first power measurement signals, the plurality of first message signals requesting the communication apparatus to transmit a second power measurement signal, said plurality of first power measurement signals being transmitted utilizing different carrier frequencies, said receiver receiving a plurality of second message signals and a plurality of second power measurement signals from the remote communication apparatus after transmitting said plurality of first message signals and said plurality of first power measurement signals, said plurality of second message signals confirming that said plurality of first power measurement signals were received by the communication apparatus, said plurality of second power measurement signals being transmitted utilizing different carrier frequencies.

8. The central communication apparatus of claim 7, wherein said transmitter transmits a third message signal representing a confirmation that said plurality of second power measurement signals were received by the central communication apparatus.

9. The central communication apparatus of claim 7, wherein said plurality of first message signals are transmitted utilizing different carrier frequencies.

10. The central communication apparatus of claim 9, wherein said different carrier frequencies utilized by said plurality of first message signals comprise 40 times a base family frequency, 56 times said base family frequency, and 64 times said base family frequency.

11. The central communication apparatus of claim 10, wherein said base family frequency comprises one of 4.3125 kHz and 4.000 kHz.

12. The central communication apparatus of claim 7, wherein said plurality of first power measurement signals and said plurality of second power measurement signals are transmitted utilizing a same plurality of carrier frequencies.

13. A method for selectively connecting a communication apparatus to a central communication apparatus, comprising:
   transmitting a request signal to the central communication apparatus that requests the central communication apparatus to transmit a plurality of first power measurement signals;
   receiving a plurality of first message signals and the plurality of first power measurement signals in response to the transmitted request signal, transmitted by the central communication apparatus, the plurality of first message signals requesting the communication apparatus to transmit a plurality of second power measurement signals, the plurality of first power measurement signals being transmitted utilizing different carrier frequencies; and
   transmitting a plurality of second message signals and the plurality of second power measurement signals to the central communication apparatus after receiving the plurality of first message signals and the plurality of first power measurement signals, the plurality of second message signals confirming that the plurality of first power measurement signals have been received by the communication apparatus, the plurality of second power measurement signals being transmitted utilizing different carrier frequencies.

14. The method of claim 13, further comprising receiving a third message signal representing a confirmation that the plurality of second power measurement signals were received by the central communication apparatus.

15. The method of claim 13, further comprising transmitting the plurality of second message signals utilizing carrier frequencies that differ from carrier frequencies utilized to transmit the plurality of first message signals.

16. The method of claim 15, wherein the different carrier frequencies utilized by the plurality of second message signals comprise 9 times a base family frequency, 17 times the base family frequency, and 25 times the base family frequency.

17. The method of claim 16, wherein the base family frequency equals one of 4.3125 kHz and 4.000 kHz.

18. A method for selectively connecting a central communication apparatus to a remote communication apparatus, comprising:
   receiving a request signal from the remote communication apparatus requesting that the central communication apparatus transmit a plurality of first power measurement signals;

transmitting a plurality of first message signals and said plurality of first power measurement signals, the plurality of first message signals requesting the communication apparatus to transmit a second power measurement signal, the plurality of first power measurement signals being transmitted utilizing different carrier frequencies; and receiving a plurality of second message signals and a plurality of second power measurement signals from the remote communication apparatus after transmitting the plurality of first message signals and the plurality of first power measurement signals, the plurality of second message signals confirming that the plurality of first power measurement signals were received by the communication apparatus, the plurality of second power measurement signals being transmitted utilizing different carrier frequencies.

19. The method of claim 18, further comprising transmitting a third message signal representing a confirmation that the plurality of second power measurement signals were received by the central communication apparatus.

20. The method of claim 18, further comprising transmitting the plurality of first message signals utilizing different carrier frequencies.

21. The method of claim 20, wherein the different carrier frequencies utilized by the plurality of first message signals comprise 40 times a base family frequency, 56 times the base family frequency, and 64 times the base family frequency.

22. The method of claim 21, wherein the base family frequency equals one of 4.3125 kHz and 4.000 kHz.

23. The method of claim 18, wherein the first plurality of power measurement signals and the plurality of second power measurement signals are transmitted utilizing a same plurality of carrier frequencies.

* * * * *

UNITED STATES PATENT AND TRADEMARK OFFICE
CERTIFICATE OF CORRECTION

PATENT NO.    : 6,917,647 B2
DATED         : July 12, 2005
INVENTOR(S)   : Stephen Palm It is certified that error appears in the above-identified patent and that said Letters Patent is hereby corrected as shown below:

<u>Title page,</u>
Item [56], References Cited, U.S. PATENT DOCUMENTS, was omitted and should be
-- 6,002,722     12/14/99         Chow et al. --; and
"Plam" should be -- Palm --, (all occurrences).

Signed and Sealed this

Twentieth Day of December, 2005

JON W. DUDAS
*Director of the United States Patent and Trademark Office*